United States Patent
Saunders

(10) Patent No.: US 7,650,314 B1
(45) Date of Patent: Jan. 19, 2010

(54) SYSTEM AND METHOD FOR SECURING A RECURRENT BILLING TRANSACTION

(75) Inventor: Peter Saunders, Salt Lake City, UT (US)

(73) Assignee: American Express Travel Related Services Company, Inc., New York, NY (US)

( * ) Notice: Subject to any disclaimer, the term of this patent is extended or adjusted under 35 U.S.C. 154(b) by 796 days.

(21) Appl. No.: 11/164,609

(22) Filed: Nov. 30, 2005

Related U.S. Application Data

(63) Continuation-in-part of application No. 10/708,569, filed on Mar. 11, 2004, and a continuation-in-part of application No. 10/340,352, filed on Jan. 10, 2003, and a continuation-in-part of application No. 10/192,488, filed on Jul. 9, 2002, now Pat. No. 7,239,226, and a continuation-in-part of application No. 09/865,878, filed on May 25, 2001, now Pat. No. 7,035,872.

(60) Provisional application No. 60/304,216, filed on Jul. 10, 2001, provisional application No. 60/396,577, filed on Jul. 16, 2002.

(51) Int. Cl.
*G06Q 20/00* (2006.01)
(52) U.S. Cl. .............................. 705/64; 705/39; 705/44
(58) Field of Classification Search .................. 705/64, 705/39, 44
See application file for complete search history.

(56) References Cited

U.S. PATENT DOCUMENTS

| | | |
|---|---|---|
| 3,376,661 A | 4/1968 | Hulett |
| 3,914,762 A | 10/1975 | Klensch |
| 4,066,873 A | 1/1978 | Schatz |
| 4,206,965 A | 6/1980 | McGrew |

(Continued)

FOREIGN PATENT DOCUMENTS

CH 689070 8/1988

(Continued)

OTHER PUBLICATIONS

"What's New: Timex Watch Features Speedpass System", http://www.speedpass.com/news/article/jsp?id=51 (1 page).

(Continued)

*Primary Examiner*—Calvin L Hewitt, II
*Assistant Examiner*—Zeshan Qayyum
(74) *Attorney, Agent, or Firm*—Snell & Wilmer L.L.P.

(57) ABSTRACT

A system and method for securing a recurrent billing transaction using a marked proxy code is disclosed. The marked proxy code includes a merchant system marker which is assigned to the merchant and a proxy code assigned to a consumer. An account issuer assigns the proxy code to the consumer and assigns the merchant system marker to one or more merchants. During system operation, a merchant provides an account issuer with a request to establish a recurrent billing account and the account issuer returns to the merchant a marked proxy code including a merchant system marker and the proxy code provided by the merchant. If a merchant requests satisfaction of a transaction, the merchant transaction request includes the marked proxy account number. The account issuer receives the marked account number and validates the merchant system marker and the proxy code prior to validating the merchant's transaction request.

18 Claims, 3 Drawing Sheets

U.S. PATENT DOCUMENTS

| | | |
|---|---|---|
| 4,303,904 A | 12/1981 | Chasek |
| 4,318,554 A | 3/1982 | Anderson et al. |
| 4,421,380 A | 12/1983 | McGrew |
| 4,443,027 A | 4/1984 | McNelly et al. |
| 4,475,308 A | 10/1984 | Heise et al. |
| 4,558,211 A | 12/1985 | Berstein |
| 4,583,766 A | 4/1986 | Wessel |
| 4,589,686 A | 5/1986 | McGrew |
| 4,593,936 A | 6/1986 | Opel |
| 4,639,765 A | 1/1987 | dHont |
| 4,656,463 A | 4/1987 | Anders et al. |
| 4,663,518 A | 5/1987 | Borror et al. |
| 4,672,021 A | 6/1987 | Blumel et al. |
| 4,700,055 A | 10/1987 | Kashkashian, Jr. |
| 4,717,221 A | 1/1988 | McGrew |
| 4,736,094 A | 4/1988 | Yoshida |
| 4,739,328 A | 4/1988 | Koelle et al. |
| 4,744,497 A | 5/1988 | O'Neal |
| 4,795,894 A | 1/1989 | Sugimoto et al. |
| 4,829,690 A | 5/1989 | Andros |
| 4,837,422 A | 6/1989 | Dethloff et al. |
| 4,839,504 A | 6/1989 | Nakano |
| 4,849,617 A | 7/1989 | Ueda |
| 4,868,849 A | 9/1989 | Tamaoki |
| 4,884,507 A | 12/1989 | Levy |
| 4,918,432 A | 4/1990 | Pauley et al. |
| 4,961,142 A | 10/1990 | Elliott et al. |
| 4,984,270 A | 1/1991 | LaBounty |
| 4,998,753 A | 3/1991 | Wichael |
| 5,023,782 A | 6/1991 | Lutz et al. |
| 5,053,774 A | 10/1991 | Schuermann et al. |
| 5,099,226 A | 3/1992 | Andrews |
| 5,101,200 A | 3/1992 | Swett |
| 5,125,356 A | 6/1992 | Galante |
| 5,197,140 A | 3/1993 | Balmer |
| 5,198,647 A | 3/1993 | Mizuta |
| 5,206,488 A | 4/1993 | Teicher |
| 5,208,110 A | 5/1993 | Smith et al. |
| 5,212,777 A | 5/1993 | Gove et al. |
| 5,221,838 A | 6/1993 | Gutman et al. |
| 5,222,282 A | 6/1993 | Sukonnik et al. |
| 5,226,989 A | 7/1993 | Sukonnik |
| 5,234,624 A | 8/1993 | Bauer et al. |
| 5,239,654 A | 8/1993 | IngSimmons et al. |
| 5,247,304 A | 9/1993 | dHont |
| 5,257,656 A | 11/1993 | McLeroy |
| 5,259,649 A | 11/1993 | Shomron |
| 5,274,392 A | 12/1993 | dHont et al. |
| 5,276,311 A | 1/1994 | Hennige |
| 5,285,100 A | 2/1994 | Byatt |
| 5,304,789 A | 4/1994 | Lob et al. |
| 5,305,002 A | 4/1994 | Holodak et al. |
| 5,308,121 A | 5/1994 | Gunn |
| 5,326,964 A | 7/1994 | Risser |
| 5,329,617 A | 7/1994 | Asal |
| 5,331,138 A | 7/1994 | Saroya |
| 5,339,447 A | 8/1994 | Balmer |
| 5,349,357 A | 9/1994 | Schurmann et al. |
| 5,351,052 A | 9/1994 | dHont et al. |
| 5,359,522 A | 10/1994 | Ryan |
| 5,365,551 A | 11/1994 | Snodgrass et al. |
| 5,371,896 A | 12/1994 | Gove et al. |
| 5,373,303 A | 12/1994 | dHont |
| 5,397,881 A | 3/1995 | Mannik |
| 5,407,893 A | 4/1995 | Koshizuka et al. |
| 5,408,243 A | 4/1995 | dHont |
| 5,410,649 A | 4/1995 | Gove |
| 5,412,192 A | 5/1995 | Hoss |
| 5,428,363 A | 6/1995 | dHont |
| 5,453,747 A | 9/1995 | dHont et al. |
| 5,471,592 A | 11/1995 | Gove et al. |
| 5,477,040 A | 12/1995 | Lalonde |
| 5,485,510 A | 1/1996 | Colbert |
| 5,488,376 A | 1/1996 | Hurta et al. |
| 5,489,411 A | 2/1996 | Jha et al. |
| 5,489,908 A | 2/1996 | Orthmann et al. |
| 5,490,079 A | 2/1996 | Sharpe et al. |
| 5,491,483 A | 2/1996 | dHont |
| 5,491,484 A | 2/1996 | Schuermann |
| 5,491,715 A | 2/1996 | Flaxl |
| 5,493,312 A | 2/1996 | Knebelkamp |
| 5,497,121 A | 3/1996 | dHont |
| 5,500,651 A | 3/1996 | Schuermann |
| 5,503,434 A | 4/1996 | Gunn |
| 5,513,525 A | 5/1996 | Schurmann |
| 5,519,381 A | 5/1996 | Marsh et al. |
| 5,522,083 A | 5/1996 | Gove et al. |
| 5,525,992 A | 6/1996 | Froschermeier |
| 5,525,994 A | 6/1996 | Hurta et al. |
| 5,528,222 A | 6/1996 | Moskowitz et al. |
| 5,530,232 A | 6/1996 | Taylor |
| 5,533,656 A | 7/1996 | Bonaldi |
| 5,534,857 A | 7/1996 | Laing et al. |
| 5,541,604 A | 7/1996 | Meier |
| 5,543,798 A | 8/1996 | Schuermann |
| 5,544,246 A | 8/1996 | Mandelbaum et al. |
| 5,548,291 A | 8/1996 | Meier et al. |
| 5,550,536 A | 8/1996 | Flaxl |
| 5,550,548 A | 8/1996 | Schuermann |
| 5,552,789 A | 9/1996 | Schuermann |
| 5,555,877 A | 9/1996 | Lockwood et al. |
| 5,557,279 A | 9/1996 | d'Hont |
| 5,557,516 A | 9/1996 | Hogan |
| 5,561,430 A | 10/1996 | Knebelkamp |
| 5,563,582 A | 10/1996 | d'Hont |
| 5,569,187 A | 10/1996 | Kaiser |
| 5,569,897 A | 10/1996 | Masuda |
| 5,572,226 A | 11/1996 | Tuttle |
| 5,577,109 A | 11/1996 | Stimson et al. |
| 5,578,808 A | 11/1996 | Taylor |
| 5,581,630 A | 12/1996 | Bonneau, Jr. |
| 5,585,787 A | 12/1996 | Wallerstein |
| 5,590,038 A | 12/1996 | Pitroda |
| 5,592,150 A | 1/1997 | D'Hont |
| 5,592,405 A | 1/1997 | Gove et al. |
| 5,592,767 A | 1/1997 | Treske |
| 5,594,233 A | 1/1997 | Kenneth et al. |
| 5,594,448 A | 1/1997 | d'Hont |
| 5,597,534 A | 1/1997 | Kaiser |
| 5,600,175 A | 2/1997 | Orthmann |
| 5,602,538 A | 2/1997 | Orthmann et al. |
| 5,602,919 A | 2/1997 | Hurta et al. |
| 5,604,342 A | 2/1997 | Fujioka |
| 5,606,520 A | 2/1997 | Gove et al. |
| 5,606,594 A | 2/1997 | Register et al. |
| 5,607,522 A | 3/1997 | McDonnell |
| 5,608,406 A | 3/1997 | Eberth et al. |
| 5,608,778 A | 3/1997 | Partridge, III |
| 5,613,146 A | 3/1997 | Gove et al. |
| 5,619,207 A | 4/1997 | d'Hont |
| 5,621,396 A | 4/1997 | Flaxl |
| 5,621,411 A | 4/1997 | Hagl et al. |
| 5,621,412 A | 4/1997 | Sharpe et al. |
| 5,625,366 A | 4/1997 | d'Hont |
| 5,625,370 A | 4/1997 | d'Hont |
| 5,625,695 A | 4/1997 | M'Raihi et al. |
| 5,629,981 A | 5/1997 | Nerlikar |
| 5,638,080 A | 6/1997 | Orthmann et al. |
| 5,640,002 A | 6/1997 | Ruppert et al. |
| 5,646,607 A | 7/1997 | Schurmann et al. |
| 5,649,118 A | 7/1997 | Carlisle et al. |
| 5,657,388 A | 8/1997 | Weiss |
| 5,660,319 A | 8/1997 | Falcone et al. |
| 5,673,106 A | 9/1997 | Thompson |

| | | | | | | |
|---|---|---|---|---|---|---|
| 5,675,342 | A | 10/1997 | Sharpe | 5,878,337 | A | 3/1999 | Joao et al. |
| 5,686,920 | A | 11/1997 | Hurta et al. | 5,878,403 | A | 3/1999 | DeFrancesco et al. |
| 5,691,731 | A | 11/1997 | van Erven | 5,880,675 | A | 3/1999 | Trautner |
| 5,692,132 | A | 11/1997 | Hogan | 5,881,272 | A | 3/1999 | Balmer |
| 5,694,596 | A | 12/1997 | Campbell | 5,883,377 | A | 3/1999 | Chapin, Jr. |
| 5,696,913 | A | 12/1997 | Gove et al. | 5,883,810 | A * | 3/1999 | Franklin et al. ............. 700/232 |
| 5,698,837 | A | 12/1997 | Furuta | 5,887,266 | A | 3/1999 | Heinonen et al. |
| 5,699,528 | A | 12/1997 | Hogan | 5,890,137 | A | 3/1999 | Koreeda |
| 5,700,037 | A | 12/1997 | Keller | 5,898,783 | A | 4/1999 | Rohrbach |
| 5,701,127 | A | 12/1997 | Sharpe | 5,903,652 | A | 5/1999 | Mital |
| 5,704,046 | A | 12/1997 | Hogan | 5,903,830 | A | 5/1999 | Joao et al. |
| 5,705,798 | A | 1/1998 | Tarbox | 5,905,798 | A | 5/1999 | Nerlikar et al. |
| 5,705,852 | A | 1/1998 | Orihara et al. | 5,912,678 | A | 6/1999 | Saxena et al. |
| 5,710,421 | A | 1/1998 | Kokubu | 5,914,472 | A | 6/1999 | Foladare et al. |
| 5,715,314 | A * | 2/1998 | Payne et al. ................... 705/78 | 5,917,168 | A | 6/1999 | Nakamura et al. |
| 5,715,399 | A | 2/1998 | Bezos | 5,920,628 | A | 7/1999 | Indeck et al. |
| 5,721,781 | A | 2/1998 | Deo et al. | 5,923,734 | A | 7/1999 | Taskett |
| 5,725,098 | A | 3/1998 | Seifert et al. | 5,923,884 | A | 7/1999 | Peyret et al. |
| 5,729,053 | A | 3/1998 | Orthmann | 5,924,080 | A | 7/1999 | Johnson |
| 5,729,236 | A | 3/1998 | Flaxl | 5,929,801 | A | 7/1999 | Aslanidis et al. |
| 5,731,957 | A | 3/1998 | Brennan | 5,930,767 | A | 7/1999 | Reber et al. |
| 5,732,579 | A | 3/1998 | d'Hont et al. | 5,931,917 | A | 8/1999 | Nguyen et al. |
| 5,748,137 | A | 5/1998 | d'Hont | 5,933,624 | A | 8/1999 | Balmer |
| 5,748,737 | A | 5/1998 | Daggar | 5,943,624 | A | 8/1999 | Fox et al. |
| 5,758,195 | A | 5/1998 | Balmer | 5,945,653 | A | 8/1999 | Walker et al. |
| 5,761,306 | A | 6/1998 | Lewis | 5,948,116 | A | 9/1999 | Aslanidis et al. |
| 5,761,493 | A | 6/1998 | Blakeley et al. | 5,950,174 | A | 9/1999 | Brendzel |
| 5,768,609 | A | 6/1998 | Gove et al. | 5,950,179 | A | 9/1999 | Buchanan |
| 5,769,457 | A | 6/1998 | Warther | 5,953,512 | A | 9/1999 | Cai et al. |
| 5,770,843 | A | 6/1998 | Rose et al. | 5,953,710 | A | 9/1999 | Fleming |
| 5,773,812 | A | 6/1998 | Kreft | 5,955,717 | A | 9/1999 | Vanstone |
| 5,774,882 | A | 6/1998 | Keen et al. | 5,955,951 | A | 9/1999 | Wischerop et al. |
| 5,777,903 | A | 7/1998 | Piosenka et al. | 5,955,969 | A | 9/1999 | d'Hont |
| 5,778,067 | A | 7/1998 | Jones et al. | 5,956,024 | A | 9/1999 | Strickland et al. |
| 5,785,680 | A | 7/1998 | Niezink et al. | 5,956,639 | A | 9/1999 | Geerlings |
| 5,789,733 | A | 8/1998 | Jachimowicz et al. | 5,956,699 | A | 9/1999 | Wong et al. |
| 5,792,337 | A | 8/1998 | Padovani et al. | 5,960,416 | A | 9/1999 | Block |
| 5,793,324 | A | 8/1998 | Aslanidis et al. | 5,963,924 | A | 10/1999 | Williams et al. |
| 5,794,095 | A | 8/1998 | Thompson | 5,969,318 | A | 10/1999 | Mackenthun |
| 5,797,060 | A | 8/1998 | Thompson | 5,970,148 | A | 10/1999 | Meier |
| 5,797,085 | A | 8/1998 | Beuk et al. | 5,970,470 | A | 10/1999 | Walker |
| 5,797,133 | A | 8/1998 | Jones et al. | 5,974,238 | A | 10/1999 | Chase, Jr. |
| 5,798,709 | A | 8/1998 | Flaxl | RE36,365 | E | 11/1999 | Levine et al. |
| 5,809,142 | A | 9/1998 | Hurta et al. | 5,978,840 | A | 11/1999 | Nguyen et al. |
| 5,809,288 | A | 9/1998 | Hurta et al. | 5,979,757 | A | 11/1999 | Tracy et al. |
| 5,809,633 | A | 9/1998 | Mundigl et al. | 5,982,293 | A | 11/1999 | Everett et al. |
| 5,825,007 | A | 10/1998 | Jesadanont | 5,983,200 | A | 11/1999 | Slotznick |
| 5,825,302 | A | 10/1998 | Stafford | 5,983,208 | A | 11/1999 | Haller |
| 5,826,077 | A | 10/1998 | Blakeley et al. | 5,987,140 | A | 11/1999 | Rowney et al. |
| 5,826,243 | A | 10/1998 | Musmanno et al. | 5,987,155 | A | 11/1999 | Dunn et al. |
| 5,828,044 | A | 10/1998 | Jun et al. | 5,987,498 | A | 11/1999 | Athing et al. |
| 5,834,756 | A | 11/1998 | Gutman et al. | 5,988,510 | A | 11/1999 | Tuttle |
| 5,838,257 | A | 11/1998 | Lambropoulos | 5,989,950 | A | 11/1999 | Wu et al. |
| 5,838,720 | A | 11/1998 | Morelli | 5,991,608 | A | 11/1999 | Leyten |
| 5,841,364 | A | 11/1998 | Hagl et al. | 5,991,748 | A | 11/1999 | Taskett |
| 5,842,088 | A | 11/1998 | Thompson | 5,991,750 | A | 11/1999 | Watson |
| 5,844,218 | A | 12/1998 | Kawan et al. | 5,996,076 | A | 11/1999 | Rowney et al. |
| 5,844,230 | A | 12/1998 | Lalonde | 6,002,438 | A | 12/1999 | Hocevar et al. |
| 5,845,267 | A | 12/1998 | Ronen | 6,002,767 | A | 12/1999 | Kramer |
| 5,851,149 | A | 12/1998 | Xidos et al. | 6,003,014 | A | 12/1999 | Lee et al. |
| 5,852,812 | A | 12/1998 | Reeder | 6,005,942 | A | 12/1999 | Chan et al. |
| 5,854,891 | A | 12/1998 | Postlewaite et al. | 6,006,216 | A | 12/1999 | Griffin et al. |
| 5,857,152 | A | 1/1999 | Everett | 6,011,487 | A | 1/2000 | Plocher |
| 5,858,006 | A | 1/1999 | Van der AA et al. | 6,012,049 | A | 1/2000 | Kawan |
| 5,859,419 | A | 1/1999 | Wynn | 6,012,636 | A | 1/2000 | Smith |
| 5,859,587 | A | 1/1999 | Alicot et al. | 6,014,645 | A | 1/2000 | Cunningham |
| 5,859,779 | A | 1/1999 | Giordano et al. | 6,016,476 | A | 1/2000 | Maes et al. |
| 5,864,306 | A | 1/1999 | Dwyer et al. | 6,016,484 | A | 1/2000 | Williams et al. |
| 5,864,323 | A | 1/1999 | Berthon | 6,018,717 | A | 1/2000 | Lee et al. |
| 5,867,100 | A | 2/1999 | d'Hont | 6,021,943 | A | 2/2000 | Chastain |
| 5,870,031 | A | 2/1999 | Kaiser et al. | 6,024,286 | A | 2/2000 | Bradley et al. |
| 5,870,915 | A | 2/1999 | d'Hont | 6,026,166 | A * | 2/2000 | LeBourgeois ............... 713/156 |
| 5,878,215 | A | 3/1999 | Kling et al. | 6,029,149 | A | 2/2000 | Dykstra et al. |

| | | | |
|---|---|---|---|
| 6,029,175 A | 2/2000 | Chow | |
| 6,029,892 A | 2/2000 | Miyake | |
| 6,032,136 A | 2/2000 | Brake, Jr. et al. | |
| 6,036,100 A | 3/2000 | Asami | |
| 6,038,292 A | 3/2000 | Thomas | |
| 6,038,584 A | 3/2000 | Balmer | |
| 6,044,360 A | 3/2000 | Picciallo | |
| 6,047,888 A | 4/2000 | Dethloff | |
| 6,050,494 A | 4/2000 | Song et al. | |
| 6,052,675 A | 4/2000 | Checchio | |
| 6,061,344 A | 5/2000 | Wood, Jr. | |
| 6,064,320 A | 5/2000 | d'Hont et al. | |
| 6,065,675 A | 5/2000 | Teicher | |
| 6,068,184 A | 5/2000 | Barnett | |
| 6,068,193 A | 5/2000 | Kreft | |
| 6,069,952 A * | 5/2000 | Saito et al. | 705/57 |
| 6,070,003 A | 5/2000 | Gove et al. | |
| 6,072,870 A | 6/2000 | Nguyen et al. | |
| 6,073,112 A | 6/2000 | Geerlings | |
| 6,073,840 A | 6/2000 | Marion | |
| 6,076,296 A | 6/2000 | Schaeffer | |
| 6,078,888 A | 6/2000 | Johnson, Jr. | |
| 6,078,908 A | 6/2000 | Schmitz | |
| RE36,788 E | 7/2000 | Mansvelt et al. | |
| 6,085,976 A | 7/2000 | Sehr | |
| 6,088,683 A | 7/2000 | Jalili | |
| 6,088,686 A | 7/2000 | Walker et al. | |
| 6,088,755 A | 7/2000 | Kobayashi et al. | |
| 6,089,611 A | 7/2000 | Blank | |
| 6,092,057 A | 7/2000 | Zimmerman et al. | |
| 6,095,567 A | 8/2000 | Buell | |
| 6,098,879 A | 8/2000 | Terranova | |
| 6,099,043 A | 8/2000 | Story | |
| 6,100,804 A | 8/2000 | Brady et al. | |
| 6,101,174 A | 8/2000 | Langston | |
| 6,101,477 A | 8/2000 | Hohle et al. | |
| 6,102,162 A | 8/2000 | Teicher | |
| 6,102,672 A | 8/2000 | Woollenweber | |
| 6,105,008 A | 8/2000 | Davis et al. | |
| 6,105,013 A | 8/2000 | Curry et al. | |
| 6,105,865 A | 8/2000 | Hardesty | |
| 6,107,920 A | 8/2000 | Eberhardt et al. | |
| 6,108,641 A | 8/2000 | Kenna et al. | |
| 6,109,525 A | 8/2000 | Blomqvist et al. | |
| 6,112,152 A | 8/2000 | Tuttle | |
| 6,115,040 A | 9/2000 | Bladow et al. | |
| 6,115,360 A | 9/2000 | Quay et al. | |
| 6,116,423 A | 9/2000 | Troxtell, Jr. et al. | |
| 6,116,505 A | 9/2000 | Withrow | |
| 6,118,189 A | 9/2000 | Flaxl | |
| 6,121,544 A | 9/2000 | Petsinger | |
| 6,123,223 A | 9/2000 | Watkins | |
| 6,129,274 A | 10/2000 | Suzuki | |
| 6,130,623 A | 10/2000 | MacLellan et al. | |
| 6,133,834 A | 10/2000 | Eberth et al. | |
| 6,138,913 A | 10/2000 | Cyr et al. | |
| 6,138,917 A | 10/2000 | Chapin, Jr. | |
| 6,141,651 A | 10/2000 | Riley et al. | |
| 6,144,916 A | 11/2000 | Wood et al. | |
| 6,144,948 A | 11/2000 | Walker et al. | |
| 6,157,824 A | 12/2000 | Bailey | |
| 6,163,771 A * | 12/2000 | Walker et al. | 705/18 |
| 6,167,236 A | 12/2000 | Kaiser et al. | |
| 6,168,083 B1 | 1/2001 | Berger et al. | |
| 6,173,269 B1 | 1/2001 | Solokl et al. | |
| 6,173,897 B1 | 1/2001 | Halpern | |
| 6,173,898 B1 | 1/2001 | Mande | |
| 6,173,899 B1 | 1/2001 | Rozin | |
| 6,177,859 B1 | 1/2001 | Tuttle et al. | |
| 6,177,860 B1 | 1/2001 | Cromer et al. | |
| 6,179,205 B1 | 1/2001 | Sloan | |
| 6,179,206 B1 | 1/2001 | Matsumori | |
| 6,181,287 B1 | 1/2001 | Beigel | |
| 6,185,307 B1 | 2/2001 | Johnson, Jr. | |
| 6,188,994 B1 | 2/2001 | Egendorf | |
| 6,189,787 B1 | 2/2001 | Dorf | |
| 6,192,255 B1 | 2/2001 | Lewis et al. | |
| 6,195,006 B1 | 2/2001 | Bowers et al. | |
| 6,198,728 B1 | 3/2001 | Hulyalkar et al. | |
| 6,198,875 B1 | 3/2001 | Edenson et al. | |
| 6,202,927 B1 | 3/2001 | Bashan et al. | |
| 6,205,151 B1 | 3/2001 | Quay et al. | |
| 6,206,293 B1 | 3/2001 | Gutman et al. | |
| 6,213,390 B1 | 4/2001 | Oneda | |
| 6,213,391 B1 | 4/2001 | Lewis | |
| 6,215,437 B1 | 4/2001 | Schurmann et al. | |
| 6,216,219 B1 | 4/2001 | Cai et al. | |
| 6,219,439 B1 | 4/2001 | Burger | |
| 6,220,510 B1 | 4/2001 | Everett et al. | |
| D442,627 S | 5/2001 | Webb et al. | |
| D442,629 S | 5/2001 | Webb et al. | |
| 6,223,984 B1 | 5/2001 | Renner et al. | |
| 6,224,109 B1 | 5/2001 | Yang | |
| 6,226,382 B1 | 5/2001 | M'Raihi et al. | |
| 6,227,447 B1 | 5/2001 | Campisano | |
| 6,230,270 B1 | 5/2001 | Laczko, Sr. | |
| 6,232,917 B1 | 5/2001 | Baumer et al. | |
| 6,233,683 B1 | 5/2001 | Chan et al. | |
| 6,237,848 B1 | 5/2001 | Everett | |
| 6,239,675 B1 | 5/2001 | Flaxl | |
| 6,240,187 B1 | 5/2001 | Lewis | |
| 6,240,989 B1 | 6/2001 | Masoud | |
| 6,248,199 B1 | 6/2001 | Smulson | |
| 6,250,554 B1 | 6/2001 | Leo et al. | |
| 6,250,557 B1 | 6/2001 | Forslund et al. | |
| 6,257,486 B1 | 7/2001 | Teicher et al. | |
| 6,259,769 B1 | 7/2001 | Page | |
| 6,260,026 B1 | 7/2001 | Tomida et al. | |
| 6,260,088 B1 | 7/2001 | Gove et al. | |
| 6,263,316 B1 | 7/2001 | Khan et al. | |
| 6,264,106 B1 | 7/2001 | Bridgelall | |
| 6,266,754 B1 | 7/2001 | Laczko, Sr. et al. | |
| 6,267,292 B1 | 7/2001 | Walker et al. | |
| 6,273,335 B1 | 8/2001 | Sloan | |
| 6,282,522 B1 | 8/2001 | Davis et al. | |
| D447,515 S | 9/2001 | Faenza, Jr. et al. | |
| 6,286,763 B1 | 9/2001 | Reynolds et al. | |
| 6,289,324 B1 | 9/2001 | Kawan | |
| 6,290,137 B1 | 9/2001 | Kiekhaefer | |
| 6,293,462 B1 | 9/2001 | Gangi | |
| 6,297,727 B1 | 10/2001 | Nelson, Jr. | |
| 6,304,223 B1 | 10/2001 | Hilton et al. | |
| 6,309,098 B1 | 10/2001 | Wong | |
| 6,315,193 B1 | 11/2001 | Hogan | |
| 6,315,195 B1 | 11/2001 | Ramacchandran | |
| 6,317,721 B1 | 11/2001 | Hurta et al. | |
| 6,318,636 B1 | 11/2001 | Reynolds et al. | |
| 6,323,566 B1 | 11/2001 | Meier | |
| 6,325,285 B1 | 12/2001 | Baratelli | |
| 6,325,293 B1 | 12/2001 | Moreno | |
| 6,326,934 B1 | 12/2001 | Kinzie | |
| 6,327,573 B1 | 12/2001 | Walker et al. | |
| 6,329,920 B1 | 12/2001 | Morrison et al. | |
| 6,331,972 B1 | 12/2001 | Harris et al. | |
| 6,339,384 B1 | 1/2002 | Valdes-Rodriguez | |
| 6,342,844 B1 | 1/2002 | Rozin | |
| 6,353,420 B1 | 3/2002 | Chung | |
| 6,353,811 B1 | 3/2002 | Weissman | |
| 6,363,363 B1 * | 3/2002 | Haller et al. | 705/40 |
| 6,364,208 B1 | 4/2002 | Stanford et al. | |
| 6,367,011 B1 | 4/2002 | Lee et al. | |
| 6,374,245 B1 | 4/2002 | Park | |
| 6,377,034 B1 | 4/2002 | Ivanov | |
| 6,378,073 B1 | 4/2002 | Davis et al. | |
| 6,386,444 B1 | 5/2002 | Sullivan | |
| 6,388,533 B2 | 5/2002 | Swoboda | |

| Patent No. | Date | Name |
|---|---|---|
| 6,390,375 B2 | 5/2002 | Kayanakis |
| 6,400,272 B1 | 6/2002 | Holtzman et al. |
| 6,402,026 B1 | 6/2002 | Schwier |
| 6,402,028 B1 | 6/2002 | Graham, Jr. et al. |
| 6,404,341 B1 | 6/2002 | Reid |
| 6,406,935 B2 | 6/2002 | Kayanakis et al. |
| 6,411,611 B1 | 6/2002 | van der Tuijn |
| 6,415,978 B1 | 7/2002 | McAllister |
| 6,421,650 B1 | 7/2002 | Goetz et al. |
| 6,422,464 B1 | 7/2002 | Terranova |
| 6,422,472 B1 | 7/2002 | Thevenot et al. |
| 6,424,029 B1 | 7/2002 | Giesler |
| RE37,822 E | 8/2002 | Anthonyson |
| 6,427,910 B1 | 8/2002 | Barnes et al. |
| 6,434,159 B1 | 8/2002 | Woodward et al. |
| 6,435,415 B1 | 8/2002 | Catte |
| 6,438,235 B2 | 8/2002 | Sims, III |
| 6,439,455 B1 | 8/2002 | Everett et al. |
| 6,442,532 B1 | 8/2002 | Kawan |
| 6,445,794 B1 | 9/2002 | Shefi |
| 6,457,996 B1 | 10/2002 | Shih |
| 6,466,804 B1 | 10/2002 | Pecen et al. |
| 6,471,127 B2 | 10/2002 | Pentz et al. |
| 6,473,500 B1 | 10/2002 | Risafi et al. |
| 6,480,100 B1 | 11/2002 | Frieden et al. |
| 6,480,101 B1 | 11/2002 | Kelly et al. |
| 6,480,869 B1 | 11/2002 | Fujioka |
| 6,481,621 B1 | 11/2002 | Herrendoerfer et al. |
| 6,481,632 B2 | 11/2002 | Wentker et al. |
| 6,483,427 B1 | 11/2002 | Werb |
| 6,483,477 B1 | 11/2002 | Plonka |
| 6,484,937 B1 | 11/2002 | Devaux et al. |
| 6,490,443 B1 | 12/2002 | Freeny, Jr. |
| 6,491,229 B1 | 12/2002 | Berney |
| 6,494,367 B1 | 12/2002 | Zacharias |
| 6,494,380 B2 | 12/2002 | Jarosz |
| 6,505,772 B1 | 1/2003 | Mollett et al. |
| 6,507,762 B1 | 1/2003 | Amro et al. |
| 6,510,983 B2 | 1/2003 | Horowitz et al. |
| 6,510,998 B1 | 1/2003 | Stanford et al. |
| 6,513,015 B2 | 1/2003 | Ogasawara |
| 6,520,542 B2 | 2/2003 | Thompson et al. |
| 6,529,880 B1 | 3/2003 | McKeen et al. |
| 6,535,726 B1 | 3/2003 | Johnson |
| 6,546,373 B1 | 4/2003 | Cerra |
| 6,547,133 B1 | 4/2003 | DeVries, Jr. et al. |
| 6,549,912 B1 | 4/2003 | Chen |
| 6,560,581 B1 | 5/2003 | Fox et al. |
| 6,575,361 B1 | 6/2003 | Graves et al. |
| 6,577,229 B1 | 6/2003 | Bonneau et al. |
| 6,578,768 B1 | 6/2003 | Binder et al. |
| 6,581,839 B1 | 6/2003 | Lasch et al. |
| 6,587,835 B1 | 7/2003 | Treyz et al. |
| 6,588,660 B1 | 7/2003 | Buescher et al. |
| 6,589,119 B1 | 7/2003 | Orus et al. |
| 6,598,024 B1 | 7/2003 | Walker et al. |
| 6,608,551 B1 | 8/2003 | Anderson et al. |
| 6,608,995 B1 | 8/2003 | Kawasaki et al. |
| 6,609,655 B1 | 8/2003 | Harrell |
| 6,623,039 B2 | 9/2003 | Thompson et al. |
| 6,626,356 B2 | 9/2003 | Davenport et al. |
| 6,628,961 B1 | 9/2003 | Ho et al. |
| 6,631,849 B2 | 10/2003 | Blossom |
| 6,636,833 B1 | 10/2003 | Flitcroft et al. |
| 6,650,887 B2 | 11/2003 | McGregor et al. |
| 6,665,405 B1 | 12/2003 | Lenstra |
| 6,671,358 B1 | 12/2003 | Seidman et al. |
| 6,674,786 B1 | 1/2004 | Nakamura et al. |
| 6,679,427 B1 | 1/2004 | Kuroiwa |
| 6,681,328 B1 | 1/2004 | Harris et al. |
| 6,684,269 B2 | 1/2004 | Wagner |
| 6,685,089 B2 | 2/2004 | Terranova et al. |
| 6,686,847 B1 | 2/2004 | Mittler |
| 6,687,714 B1 | 2/2004 | Kogen et al. |
| 6,690,930 B1 | 2/2004 | Dupre |
| 6,693,513 B2 | 2/2004 | Tuttle |
| 6,705,530 B2 | 3/2004 | Kiekhaefer |
| 6,708,375 B1 | 3/2004 | Johnson |
| 6,711,262 B1 | 3/2004 | Watanen |
| 6,732,919 B2 | 5/2004 | Macklin et al. |
| 6,732,936 B1 | 5/2004 | Kiekhaefer |
| 6,742,120 B1 | 5/2004 | Markakis et al. |
| 6,747,546 B1 | 6/2004 | Hikita et al. |
| 6,749,123 B2 | 6/2004 | Lasch et al. |
| 6,760,581 B2 | 7/2004 | Dutta |
| 6,764,014 B2 | 7/2004 | Lasch et al. |
| 6,769,718 B1 | 8/2004 | Warther et al. |
| 6,771,981 B1 | 8/2004 | Zalewski et al. |
| 6,789,012 B1 | 9/2004 | Childs et al. |
| 6,789,733 B2 | 9/2004 | Terranova et al. |
| 6,793,141 B1 | 9/2004 | Graham |
| 6,830,193 B2 | 12/2004 | Tanaka |
| 6,851,617 B2 | 2/2005 | Saint et al. |
| 6,853,087 B2 | 2/2005 | Neuhaus et al. |
| 6,853,894 B1 | 2/2005 | Kolls |
| 6,857,566 B2 | 2/2005 | Wankmueller |
| 6,859,672 B2 | 2/2005 | Roberts et al. |
| 6,895,310 B1 | 5/2005 | Kolls |
| 6,915,277 B1 | 7/2005 | Manchester et al. |
| 6,924,729 B1 | 8/2005 | Aschauer et al. |
| 6,925,565 B2 | 8/2005 | Black |
| D509,243 S | 9/2005 | Hunter, Jr. et al. |
| 6,978,933 B2 | 12/2005 | Yap et al. |
| 6,994,262 B1 | 2/2006 | Warther |
| 7,004,385 B1 | 2/2006 | Douglass |
| 7,069,444 B2 | 6/2006 | Lowensohn et al. |
| 7,070,112 B2 | 7/2006 | Beenau et al. |
| 7,093,767 B2 | 8/2006 | Faenza et al. |
| 7,103,575 B1 | 9/2006 | Linehan |
| 7,119,659 B2 | 10/2006 | Bonalle et al. |
| 7,172,112 B2 | 2/2007 | Bonalle et al. |
| 7,287,695 B2 | 10/2007 | Wankmueller |
| 7,406,442 B1 * | 7/2008 | Kottmeier et al. ............. 705/35 |
| 2001/0013542 A1 | 8/2001 | Horowitz et al. |
| 2001/0024157 A1 | 9/2001 | Hansmann et al. |
| 2001/0030238 A1 | 10/2001 | Arisawa |
| 2001/0034565 A1 | 10/2001 | Leatherman |
| 2001/0039617 A1 | 11/2001 | Buhrlen et al. |
| 2002/0002468 A1 | 1/2002 | Spagna et al. |
| 2002/0011519 A1 | 1/2002 | Shults |
| 2002/0019807 A1 | 2/2002 | Halpern |
| 2002/0028704 A1 | 3/2002 | Bloomfield et al. |
| 2002/0035548 A1 | 3/2002 | Hogan et al. |
| 2002/0040935 A1 | 4/2002 | Weyant |
| 2002/0040936 A1 | 4/2002 | Wentker et al. |
| 2002/0052839 A1 | 5/2002 | Takatori |
| 2002/0062284 A1 | 5/2002 | Kawan |
| 2002/0074398 A1 | 6/2002 | Lancos et al. |
| 2002/0077837 A1 | 6/2002 | Krueger et al. |
| 2002/0077895 A1 | 6/2002 | Howell |
| 2002/0077992 A1 | 6/2002 | Tobin |
| 2002/0079367 A1 | 6/2002 | Montani |
| 2002/0092914 A1 | 7/2002 | Pentz et al. |
| 2002/0095343 A1 | 7/2002 | Barton et al. |
| 2002/0095389 A1 | 7/2002 | Gaines |
| 2002/0095587 A1 | 7/2002 | Doyle et al. |
| 2002/0097144 A1 | 7/2002 | Collins et al. |
| 2002/0107007 A1 | 8/2002 | Gerson |
| 2002/0107742 A1 | 8/2002 | Magill |
| 2002/0107798 A1 | 8/2002 | Hameau et al. |
| 2002/0109580 A1 | 8/2002 | Shreve et al. |
| 2002/0111210 A1 | 8/2002 | Luciano, Jr. et al. |
| 2002/0113082 A1 | 8/2002 | Leatherman et al. |
| 2002/0116274 A1 | 8/2002 | Hind et al. |
| 2002/0120584 A1 | 8/2002 | Hogan et al. |
| 2002/0126010 A1 | 9/2002 | Trimble et al. |

| | | |
|---|---|---|
| 2002/0131567 A1 | 9/2002 | Maginas |
| 2002/0138425 A1 | 9/2002 | Shimizu et al. |
| 2002/0138438 A1 | 9/2002 | Bardwell |
| 2002/0140542 A1 | 10/2002 | Prokoski et al. |
| 2002/0145043 A1 | 10/2002 | Challa et al. |
| 2002/0147913 A1 | 10/2002 | Lun Yip |
| 2002/0148892 A1 | 10/2002 | Bardwell |
| 2002/0152123 A1 | 10/2002 | Giordano et al. |
| 2002/0165931 A1 | 11/2002 | Greer et al. |
| 2002/0166891 A1 | 11/2002 | Stoutenburg et al. |
| 2002/0176522 A1 | 11/2002 | Fan |
| 2002/0178063 A1 | 11/2002 | Gravelle et al. |
| 2002/0178369 A1 | 11/2002 | Black |
| 2002/0179704 A1 | 12/2002 | Deaton |
| 2002/0185543 A1 | 12/2002 | Pentz et al. |
| 2002/0188501 A1 | 12/2002 | Lefkowith |
| 2002/0190125 A1 | 12/2002 | Stockhammer |
| 2002/0192856 A1 | 12/2002 | Halope et al. |
| 2002/0193102 A1 | 12/2002 | Hyyppa et al. |
| 2002/0194303 A1 | 12/2002 | Suila et al. |
| 2002/0194503 A1 | 12/2002 | Faith et al. |
| 2002/0196963 A1 | 12/2002 | Bardwell |
| 2003/0009382 A1 | 1/2003 | DArbeloff et al. |
| 2003/0014307 A1 | 1/2003 | Heng |
| 2003/0014357 A1 | 1/2003 | Chrisekos et al. |
| 2003/0014891 A1 | 1/2003 | Nelms et al. |
| 2003/0018532 A1 | 1/2003 | Dudek et al. |
| 2003/0025600 A1 | 2/2003 | Blanchard |
| 2003/0028481 A1 | 2/2003 | Flitcroft et al. |
| 2003/0033697 A1 | 2/2003 | Hicks et al. |
| 2003/0037851 A1 | 2/2003 | Hogganvik |
| 2003/0046228 A1 | 3/2003 | Berney |
| 2003/0054836 A1 | 3/2003 | Michot |
| 2003/0055727 A1 | 3/2003 | Walker et al. |
| 2003/0057226 A1 | 3/2003 | Long |
| 2003/0057278 A1 | 3/2003 | Wong |
| 2003/0069828 A1 | 4/2003 | Blazey et al. |
| 2003/0069846 A1 | 4/2003 | Marcon |
| 2003/0112972 A1 | 6/2003 | Hattick et al. |
| 2003/0115126 A1 | 6/2003 | Pitroda |
| 2003/0120554 A1 | 6/2003 | Hogan et al. |
| 2003/0121969 A1 | 7/2003 | Wankmueller |
| 2003/0130820 A1 | 7/2003 | Lane, III |
| 2003/0132284 A1 | 7/2003 | Reynolds et al. |
| 2003/0140228 A1 | 7/2003 | Binder |
| 2003/0160074 A1 | 8/2003 | Pineda |
| 2003/0163699 A1 | 8/2003 | Pailles et al. |
| 2003/0167207 A1 | 9/2003 | Berardi et al. |
| 2003/0177347 A1 | 9/2003 | Schneier et al. |
| 2003/0183689 A1 | 10/2003 | Swift et al. |
| 2003/0183695 A1 | 10/2003 | Labrec et al. |
| 2003/0183699 A1 | 10/2003 | Masui |
| 2003/0187786 A1 | 10/2003 | Swift et al. |
| 2003/0187787 A1 | 10/2003 | Freund |
| 2003/0187790 A1 | 10/2003 | Swift et al. |
| 2003/0187796 A1 | 10/2003 | Swift et al. |
| 2003/0195037 A1 | 10/2003 | Vuong et al. |
| 2003/0195842 A1 | 10/2003 | Reece |
| 2003/0195843 A1 | 10/2003 | Matsuda et al. |
| 2003/0200184 A1 | 10/2003 | Dominguez et al. |
| 2003/0218066 A1 | 11/2003 | Fernandes et al. |
| 2003/0220876 A1 | 11/2003 | Burger et al. |
| 2003/0222153 A1 | 12/2003 | Pentz et al. |
| 2003/0225623 A1 | 12/2003 | Wankmueller |
| 2003/0225713 A1 | 12/2003 | Atkinson et al. |
| 2003/0227550 A1 | 12/2003 | Manico et al. |
| 2003/0230514 A1 | 12/2003 | Baker |
| 2003/0233334 A1 | 12/2003 | Smith |
| 2004/0010462 A1 | 1/2004 | Moon et al. |
| 2004/0011877 A1 | 1/2004 | Reppermund |
| 2004/0015451 A1 | 1/2004 | Sahota et al. |
| 2004/0016796 A1 | 1/2004 | Hanna et al. |
| 2004/0026518 A1 | 2/2004 | Kudo et al. |
| 2004/0029569 A1 | 2/2004 | Khan et al. |
| 2004/0030601 A1 | 2/2004 | Pond et al. |
| 2004/0039814 A1 | 2/2004 | Crabtree et al. |
| 2004/0039860 A1 | 2/2004 | Mills et al. |
| 2004/0046034 A1 | 3/2004 | Ey Yamani et al. |
| 2004/0127256 A1 | 7/2004 | Goldthwaite et al. |
| 2004/0139021 A1 | 7/2004 | Reed et al. |
| 2004/0160310 A1 | 8/2004 | Chen et al. |
| 2004/0176071 A1 | 9/2004 | Gehrmann et al. |
| 2004/0177045 A1 | 9/2004 | Brown |
| 2004/0180657 A1 | 9/2004 | Yaqub et al. |
| 2004/0193676 A1 | 9/2004 | Marks |
| 2004/0235450 A1 | 11/2004 | Rosenberg |
| 2005/0004921 A1 | 1/2005 | Beenau et al. |
| 2005/0017068 A1 | 1/2005 | Zalewski et al. |
| 2005/0023157 A1 | 2/2005 | Logan |
| 2005/0033686 A1 | 2/2005 | Peart et al. |
| 2005/0033688 A1 | 2/2005 | Pert et al. |
| 2005/0035192 A1 | 2/2005 | Bonalle et al. |
| 2005/0035847 A1 | 2/2005 | Bonalle et al. |
| 2005/0038718 A1 | 2/2005 | Barnes et al. |
| 2005/0040272 A1 | 2/2005 | Argumedo et al. |
| 2005/0045718 A1 | 3/2005 | Bortolin et al. |
| 2005/0113137 A1 | 5/2005 | Rodriguez et al. |
| 2005/0121512 A1 | 6/2005 | Wankmueller |
| 2005/0122209 A1 | 6/2005 | Black |
| 2005/0125312 A1 | 6/2005 | Dearing et al. |
| 2005/0127164 A1 | 6/2005 | Wankmueller |
| 2005/0149358 A1 | 7/2005 | Sacco et al. |
| 2005/0171905 A1 | 8/2005 | Wankmueller |
| 2005/0207002 A1 | 9/2005 | Liu et al. |
| 2005/0221853 A1 | 10/2005 | Silvester |
| 2006/0178937 A1 | 8/2006 | Rau et al. |

FOREIGN PATENT DOCUMENTS

| | | |
|---|---|---|
| CH | 689680 | 8/1999 |
| DE | 2847756 | 5/1980 |
| DE | 29702538 | 4/1997 |
| EP | 0 181 770 | 5/1986 |
| EP | 0 343 829 A2 | 11/1989 |
| EP | 0 354 817 B1 | 2/1990 |
| EP | 0358525 | 3/1990 |
| EP | 0 368 570 A2 | 5/1990 |
| EP | 0 388 090 B1 | 9/1990 |
| EP | 0424726 | 10/1990 |
| EP | 0 403 134 A2 | 12/1990 |
| EP | 0 411 602 A2 | 2/1991 |
| EP | 0411602 | 2/1991 |
| EP | 0 473 998 A2 | 3/1992 |
| EP | 0 481 388 B1 | 4/1992 |
| EP | 0 531 605 B1 | 3/1993 |
| EP | 0 552 047 B1 | 7/1993 |
| EP | 0 560 318 B1 | 9/1993 |
| EP | 0 568 185 B1 | 11/1993 |
| EP | 0 567 297 B1 | 6/1995 |
| EP | 0 721 850 A2 | 7/1996 |
| EP | 0780839 | 6/1997 |
| EP | 0 789 316 B1 | 8/1997 |
| EP | 0 866 420 A2 | 9/1998 |
| EP | 0 894 620 A1 | 2/1999 |
| EP | 0 916 519 | 5/1999 |
| EP | 0933717 | 8/1999 |
| EP | 0949595 | 10/1999 |
| EP | 0956818 | 11/1999 |
| EP | 0959440 | 11/1999 |
| EP | 200011109 | 1/2000 |
| EP | 0984404 | 3/2000 |
| EP | 1016947 | 7/2000 |
| EP | 1039403 | 9/2000 |
| EP | 1104909 | 6/2001 |
| EP | 1113387 | 7/2001 |
| EP | 1199684 | 4/2002 |

| | | |
|---|---|---|
| EP | 1251450 | 10/2002 |
| EP | 1345146 | 9/2003 |
| GB | 1 371 254 | 10/1974 |
| GB | 2 108 906 A | 5/1983 |
| GB | 2 240 948 A | 8/1991 |
| GB | 2347537 | 9/2000 |
| GB | 2350021 | 11/2000 |
| JP | 62-43774 | 3/1987 |
| JP | 62-264999 | 11/1987 |
| JP | 63-071794 | 4/1988 |
| JP | 63-098689 | 4/1988 |
| JP | 63-72721 | 5/1988 |
| JP | 63-175987 | 7/1988 |
| JP | 64-004934 | 1/1989 |
| JP | 64-087395 | 3/1989 |
| JP | 64-087396 | 3/1989 |
| JP | 64-087397 | 3/1989 |
| JP | 02-130737 | 5/1990 |
| JP | 02-252149 | 10/1990 |
| JP | 03-290 780 | 12/1991 |
| JP | 42-005596 | 7/1992 |
| JP | 04-303692 | 10/1992 |
| JP | 05-069689 | 3/1993 |
| JP | 05-254283 | 10/1993 |
| JP | 06-183187 | 7/1994 |
| JP | 06-191137 | 7/1994 |
| JP | 06-234287 | 8/1994 |
| JP | 07-173358 | 7/1995 |
| JP | 07-205569 | 8/1995 |
| JP | 08-244385 | 9/1996 |
| JP | 08-324163 | 12/1996 |
| JP | 09-050505 | 2/1997 |
| JP | 09-052240 | 2/1997 |
| JP | 09-274640 | 10/1997 |
| JP | 10-129161 | 5/1998 |
| JP | 10-289296 | 10/1998 |
| JP | 10-334206 | 12/1998 |
| JP | 10-340231 | 12/1998 |
| JP | 11-175640 | 7/1999 |
| JP | 11-227367 | 8/1999 |
| JP | 11-353425 | 12/1999 |
| JP | 2000015288 | 1/2000 |
| JP | 2000-048153 | 2/2000 |
| JP | 2000040181 | 2/2000 |
| JP | 2000067312 | 3/2000 |
| JP | 2000-17729 | 6/2000 |
| JP | 2000-163538 | 6/2000 |
| JP | 2000-194799 | 7/2000 |
| JP | 2000207641 | 7/2000 |
| JP | 2000-222176 | 8/2000 |
| JP | 2000-252854 | 9/2000 |
| JP | 20015931 | 1/2001 |
| JP | 2001-405506 | 4/2001 |
| JP | 2001-134536 | 5/2001 |
| JP | 2001-160105 | 6/2001 |
| JP | 2001283122 | 10/2001 |
| JP | 2001-315475 | 11/2001 |
| JP | 2002-109584 | 4/2002 |
| JP | 2002-133335 | 5/2002 |
| JP | 2002-157530 | 5/2002 |
| JP | 2002-274087 | 9/2002 |
| JP | 2003-288646 | 10/2003 |
| WO | WO 81/00776 | 3/1981 |
| WO | WO 89/03760 | 5/1989 |
| WO | WO 90/08661 | 8/1990 |
| WO | WO 92/16913 | 10/1992 |
| WO | 9532919 | 12/1995 |
| WO | WO 95/35546 | 12/1995 |
| WO | WO 96/18972 | 6/1996 |
| WO | 9740459 | 10/1997 |
| WO | 9903057 | 1/1999 |
| WO | WO 99/12136 | 3/1999 |
| WO | WO 99/14055 | 3/1999 |
| WO | WO 99/27492 | 6/1999 |
| WO | WO 99/40548 | 8/1999 |
| WO | WO 99/47983 | 9/1999 |
| WO | 0010144 | 2/2000 |
| WO | 0038088 | 6/2000 |
| WO | 0104825 | 1/2001 |
| WO | 0115098 | 3/2001 |
| WO | 0143095 | 6/2001 |
| WO | WO 01/55955 | 8/2001 |
| WO | 0172224 | 10/2001 |
| WO | 0177856 | 10/2001 |
| WO | 0180473 | 10/2001 |
| WO | 0186535 | 11/2001 |
| WO | 0190962 | 11/2001 |
| WO | 0195243 | 12/2001 |
| WO | 0201485 | 1/2002 |
| WO | 0213134 | 2/2002 |
| WO | 0221903 | 3/2002 |
| WO | 02063545 | 8/2002 |
| WO | 02065246 | 8/2002 |
| WO | 02065404 | 8/2002 |
| WO | 02069221 | 9/2002 |
| WO | 02073512 | 9/2002 |
| WO | 02086665 | 10/2002 |
| WO | 02091281 | 11/2002 |
| WO | 0297575 | 12/2002 |
| WO | 02101670 | 12/2002 |
| WO | WO 03/007623 | 1/2003 |

OTHER PUBLICATIONS

"Physical Reality: A Second Look", Ken Sharp, Senior Technical Editor, http://www.idsystems.com/reader/1999_03/phys0399_pt2/phys0399_pt2.htm (6 pages).

"Magic Wands' to Speed Mobile Sales", Bob Brewin, Jan. 15, 2001, http://www.computerworld.com/mobiletopics/mobile/story/1,10801,563300.html (4 pages).

"Mobile Speedpass Goes Global as Mobil Singapore Rolls Out Asia's First RFID-Based Pay-At-The-Pump System", Press Release, Apr. 5, 1999, http://www.ti..com/tiris/docs/news_releases/rel12.htm (3 pages).

"Speedpass Unleashed", Jun. 4, 2002, http://www.cardweb.com/cardtrak/news/cf2_20a_97.html (2 pages).

Prophecy Central Update #9, Oct. 10, 1997, http://www/bible-prophecy.com/pcu9.htm (5 pages).

International newsletter of the TI RFID Group, Issue 20, 2000 (12 pages).

"CES: Microsoft's SPOT Technology Has Humble Origins", by James Niccolai, Jan. 10, 2003, http://archive,inforworld.com/articles/hn/sml/03/01/10/03011hnspot.xml?s=IDGNS (3 pages).

"Microsoft: See SPOT Run On Your Wrist", by Richard Shim, Jun. 5, 2003, http://news.com.com.2100-1041_3-101442.html?tag=fd_top (1 page).

"Networking: Microsoft SPOT", by Jeremy A. Kaplan, Jul. 1, 2003, http://www.pcmag.com/print_article/0,3048,a=43561,00.asp (2 pages).

"Microsoft Launches Smart Personal Object Technology Initiative", Press Release from COMDEX Fall 2002, Nov. 17, 2002, http://www.Microsoft.com/presspass/features/2002/nov02/11-17SPOT.asp (4 pages).

"Bank Extends RFID Payment Pilot: Bank of America will continue to test its Quick Wave RFID payment card for another three months", RFID Journal, Jan. 23, 2003.

MasterCard to Test RFID Card: Pilot will test whether consumers, merchants and credit card issuers value "contactless payments", RFID Journal, Dec. 20, 2002.

"Vendors Target Amusement Parks: Protecting children and enabling cashless payments make RFID an appealing option for the entertainment industry", RFID Journal, Nov. 27, 2002.

"Inside's Next-Gen Smart Card: The French company plans to introduce an RFID card that uses a 16-bit microprocessor and new encryption technology", RFID Journal, Oct. 29, 2002.

"Sony, Phillips Creating RFID Link: Consumer electronics giants are jointly developing a new RFID standard for payments and for communication between devices", RFID Journal, Sep. 17, 2002.

"Japan Gets Digital Ticket System: A national ticket seller and phone company are teaming up to create an electronic ticket", RFID Journal, Aug. 31, 2002.

"Security for Wireless Java: NTRU, a startup that offers security software, has released of Java version of its NTRU encryption algorithm", RFID Journal, Jun. 27, 2002.

"Making RFID Payments Ubiquitous: Phillips and Visa want people to be able to pay for goods and services anywhere by using RFID chips embedded in the phones and other devices", RFID Journal, Jun. 2, 2003.

"RFID Smart Cards Gain Ground: The convenience of contactless transactions is driving widespread adoption of contactless smart cards", RFID Journal, Apr. 9, 2003.

"TI Embraces Prox Card Standard: Texas Instruments ISO 14443 payment platform promises faster data transfer rates and more security", RFID Journal, Mar. 6, 2003.

"Multiple Frequency Transponders: Volume production of dual-band RFID chips begins", Frontline Solutions, Jul. 16, 2003.

Functional Specification, Standard Card IC MF1 S50, Philips Semiconductors, Product Specification Rev. 5.1 May 2001.

Financial Technology International Bulletin, V14, n1, p4, Sep. 1996.

http://www.semiconductors.phillips.com/news/content/file_878.html, Apr. 7, 2003.

http://www.palowireless.com/infotooth/whatis.asp, Apr. 28, 2003.

http://www.palowireless.com/infotooth/tutorial.asp, Apr. 28, 2003.

http://www.palowireless.com/infotooth/tutorial/profiles.asp, Apr. 28, 2003.

http://www.palowireless.com/infotooth/tutorial/radio.asp, Apr. 28, 2003.

http://www.polowireless.com/infotooth/tutorial/baseband.asp, Apr. 28, 2003.

http://www.palowireless.com/infotooth/tutoriaI/lmp.asp, Apr. 28, 2003.

http://www.palowireless.com/infotooth/tutorial/hci.asp, Apr. 28, 2003.

http://www.palowireless.com/infotooth/tutoria1/12cap.asp, Apr. 28, 2003.

http://www.palowireless.com/infotooth/tutorial/rfcomm.asp, Apr. 28, 2003.

http://www.palowireless.com/infotooth/tutorial/sdp.asp, Apr. 28, 2003.

http://www.palowireless.com/infotooth/tutorialk1_gap.asp, Apr. 28, 2003.

"Sony, Phillips to Test RFID Platform", RFID Journal, May 8, 2003.

USBanker, Article 5, 1995, http://www.banking.com/us-banker/art5.

Green, Thomas C., "American Express Offers temporary CC numbers for the web," Sep. 9, 2000, The Register, www.theregister.c.uk/c.

CNN.com, U.S. News, "American Express to offer disposable credit card numbers," Sep. 8, 2000, Associated Press, www.cnn.c.

American Express, "Private Payments (SM) ; A New Level of Security from American Express," American Express Website, Cards.

Martin, Zack, "One-Time Numbers Stop Web Hackers From Pilfering Data," Jan. 2001, Card Marketing, Thomson Financial, www.c rdf rum.c.

The Dollar Stretcher, "Disposable Credit Card Numbers," Jan. 2001, CardRatings.org, www.stretcher.c.

ISO/IEC 7816-6:1996(E)—First Edition—May 15, 1996.

ISO/IEC 7816-4:1995(E)—First Edition—Sep. 1, 1995.

Final Office Action issued Feb. 6, 2009 in U.S. Appl. No. 11/306,617.

ISR issued May 22, 2008 in PCT/US06/045362.

Written Opinion issued Jul. 9, 2008 in PCT/US06/045362.

Notice of Allowance issued Mar. 3, 2009 in U.S. Appl. No. 11/161,295.

Requirement for Restriction issued Jan. 12, 2009 in U.S. Appl. No. 11/552,886.

* cited by examiner

SYSTEM AND METHOD FOR SECURING A RECURRENT BILLING TRANSACTION

CROSS-REFERENCE TO RELATED APPLICATIONS

This invention is a continuation in part of, and claims priority to U.S. patent application Ser. No. 10/192,488, entitled "SYSTEM AND METHOD FOR PAYMENT USING RADIO FREQUENCY IDENTIFICATION IN CONTACT AND CONTACTLESS TRANSACTIONS," filed on Jul. 9, 2002 (which itself claims priority to U.S. Provisional Patent Application No. 60/304,216, filed Jul. 10, 2001); to U.S. patent application Ser. No. 10/340,352, entitled "SYSTEM AND METHOD FOR INCENTING PAYMENT USING RADIO FREQUENCY IDENTIFICATION IN CONTACT AND CONTACTLESS TRANSACTIONS," filed Jan. 10, 2003 (which itself claims priority to U.S. Provisional Patent Application No. 60/396,577, filed Jul. 16, 2002); to U.S. patent application Ser. No. 10/708,569, entitled "SYSTEM AND METHOD SECURING SENSITIVE INFORMATION DURING COMPLETION OF A TRANSACTION," filed Mar. 11, 2004; and to U.S. patent application Ser. No. 09/865,878, entitled "RECURRENT BILLING MAINTENANCE SYSTEM," filed May 25, 2001, all of which are incorporated herein by reference.

FIELD OF INVENTION

This invention generally relates to securing a transaction involving radio frequency identification (RFID) technology. More particularly, the invention pertains to a system and method for securing the RFID enabled transaction using a proxy code or number, which hides the underlying payment device information from the merchant system.

BACKGROUND OF INVENTION

Like barcode and voice data entry, RFID is a contactless information acquisition technology. Of late, companies are increasingly embodying RFID data acquisition technology in a fob or tag for use in completing financial transactions. During the transaction completion, information from the RFID fob is ordinarily passed to the POS, which delivers the information to a merchant system.

To complete the transaction, fob identification data is typically passed to a third-party server database. The third-party server references the identification data to a consumer (e.g., user) transaction account (e.g., charge, credit, debit, loyalty, etc). In an exemplary processing method, the third-party server may seek authorization for the transaction by passing the transaction and account data to an authorizing entity, such as for example an "acquirer" and/or account issuer. Once the server receives authorization from the authorizing entity, the authorizing entity sends clearance to the POS device for completion of the transaction.

In addition to sending the information to an issuer system for verification, the merchant system may store the information in a merchant system database for later reference. For example, where the transaction device user is a repeat consumer, the transaction device user may wish to complete the transaction using transaction account information previously submitted to the merchant system. Since the account information is stored on the merchant system, the user need not provide the information to a merchant to complete subsequent transactions. Instead, the user may indicate to the merchant to use the transaction account information stored on the merchant system for transaction completion.

In another typical example, the merchant system may store the transaction account information for later reference when the transaction device user establishes a "recurrent billing" account. In this instance, the merchant may periodically charge a user for services rendered and/or goods purchased. The user may authorize the merchant system to seek satisfaction of the bill using the transaction account information. The merchant may thereby send a transaction request regarding the bill to an account provider, and/or a third-party server.

To lessen the financial impact of fraudulent transactions in the RFID environment, fob issuers have focused much effort on securing RFID transactions. Many of the efforts have focused on securing the transaction account and/or related data during transmission from the user to the merchant, and/ or from the merchant to a third-party server and/or account provider system. For example, one conventional method for securing RFID transactions involves requiring the device user to provide a secondary form of identification during transaction completion. The RFID transaction device user may be asked to enter a personal identification number (PIN) into a keypad. The PIN may then be verified against a number associated with the user and/or the RFID transaction device, wherein the associated number is stored in an account issuer database. If the PIN number provided by the device user matches the associated number, then the transaction may be cleared for completion.

One problem with the issuer's efforts in securing RFID transactions is that they typically do not focus on the ways to guard the transaction account information stored on the merchant system from theft. As noted, the merchant may typically store on a merchant database the information received from the transaction device during a transaction. Such information may be sensitive information concerning the fob user or the fob user's account. Should the fob user's sensitive information be retrieved from the merchant system without authorization, the fob user or issuer may be subjected to fraudulent activity. The ability to secure the sensitive information stored on the merchant system is limited by the security measures taken by the merchant in securing its merchant system database. Consequently, the account provider often has little influence over the security of the account information once the information is provided to the merchant system.

As such, a need exists for a method of securing sensitive transaction account information which permits the account provider to have a significant influence on the security of the fob user information stored on a merchant system. A suitable system may secure the sensitive information irrespective of the merchant system.

SUMMARY OF INVENTION

A system and method for securing transactions is described which addresses the problems found in conventional transaction securing methods. The securing method described herein includes providing a proxy code to a merchant system for use as the customer identifier during a transaction instead of the merchant providing sensitive transaction account information. A transaction device in accordance with the invention provides the proxy code and/or proxy number to the merchant system contemporaneously with a transaction request. The merchant system receives the proxy code and correlates the proxy code to a user or transaction in the merchant system. The merchant system stores the proxy code in a merchant database for later reference.

In one embodiment, the proxy code does not include any sensitive information about the transaction device user or user transaction account. Instead the merchant system receives a proxy code, which takes the place of the sensitive information ordinarily received during transaction completion. In other words, certain information such as the user's actual account number is never transmitted to the merchant. Thus, the user's account number is not available should the merchant system be compromised.

In accordance with one exemplary embodiment of the invention, a radio frequency identification (RFID) transaction device is used to complete a transaction. The RFID transaction device is interrogated by a RFID reader operable to provide a RF interrogation signal for powering a transponder system. The RFID reader receives the proxy code instead of sensitive transaction device information, and the merchant receives the transaction device proxy code from the RFID transaction device and provides the proxy code to an authorizing agent, such as an acquirer or an account issuer, for verification. For example, the authorizing agent verifies that the proxy code corresponds to a valid transaction account on the account provider system. The authorizing agent uses the proxy code to locate the appropriate verifying (e.g., "validating") information for confirming the transaction account validity. Once the authorizing agent verifies the validity of the transaction account using the proxy code, the authorizing entity (e.g., account issuer or acquirer) provides authorization to the merchant that a transaction may be completed.

In another exemplary embodiment, a non-RFID transaction device is used to complete a transaction. The non-RFID transaction device could be a magnetic stripe card, a computer-based program, and/or the like. The computer-based program could be used, for example, for initiating the recurring payment via the Internet.

In one exemplary embodiment, the RFID reader is additionally validated. In this instance, the RFID reader is provided a RFID reader authentication tag which is used to validate the reader. During transaction completion, the RFID reader receives the RFID transaction device proxy code and the reader provides the transaction device proxy code and the reader authentication tag to an authorizing agent, such as an acquirer. In a similar manner as with the transaction account, the acquirer then validates that the RFID reader is an authorized reader for facilitating a RF transaction with the account issuer. If the RFID reader is validated, the acquirer provides the RFID transaction device identifier to an account provider for RFID device verification. The account issuer then verifies that the RFID transaction device is authorized to complete the requested transaction. Alternatively, the account issuer directly validates the reader.

In yet another embodiment of the invention, the proxy code is assigned to a single merchant or multiple merchants. Upon receiving a request from a merchant to establish a recurring account for a consumer, the account issuer provides the merchant with a marked proxy code that is unique to the consumer. The marked proxy code includes a marker that is predetermined by the account issuer and which corresponds to one or more merchants. The merchant correlates the marked proxy code to a particular consumer and stores the marked proxy code relative to the consumer in a merchant database. When the merchant submits a transaction request to an account issuer for satisfaction, the account issuer verifies that the transaction is received from an authorized merchant by validating that the marker included in the marked proxy code corresponds with the marked proxy code that the account issuer has assigned to the merchant providing the transaction request.

These features and other advantages of the system and method, as well as the structure and operation of various exemplary embodiments of the system and method, are described below.

BRIEF DESCRIPTION OF THE DRAWINGS

The accompanying drawings, wherein like numerals depict like elements, illustrate exemplary embodiments of the present invention.

DETAILED DESCRIPTION

Figure 1:
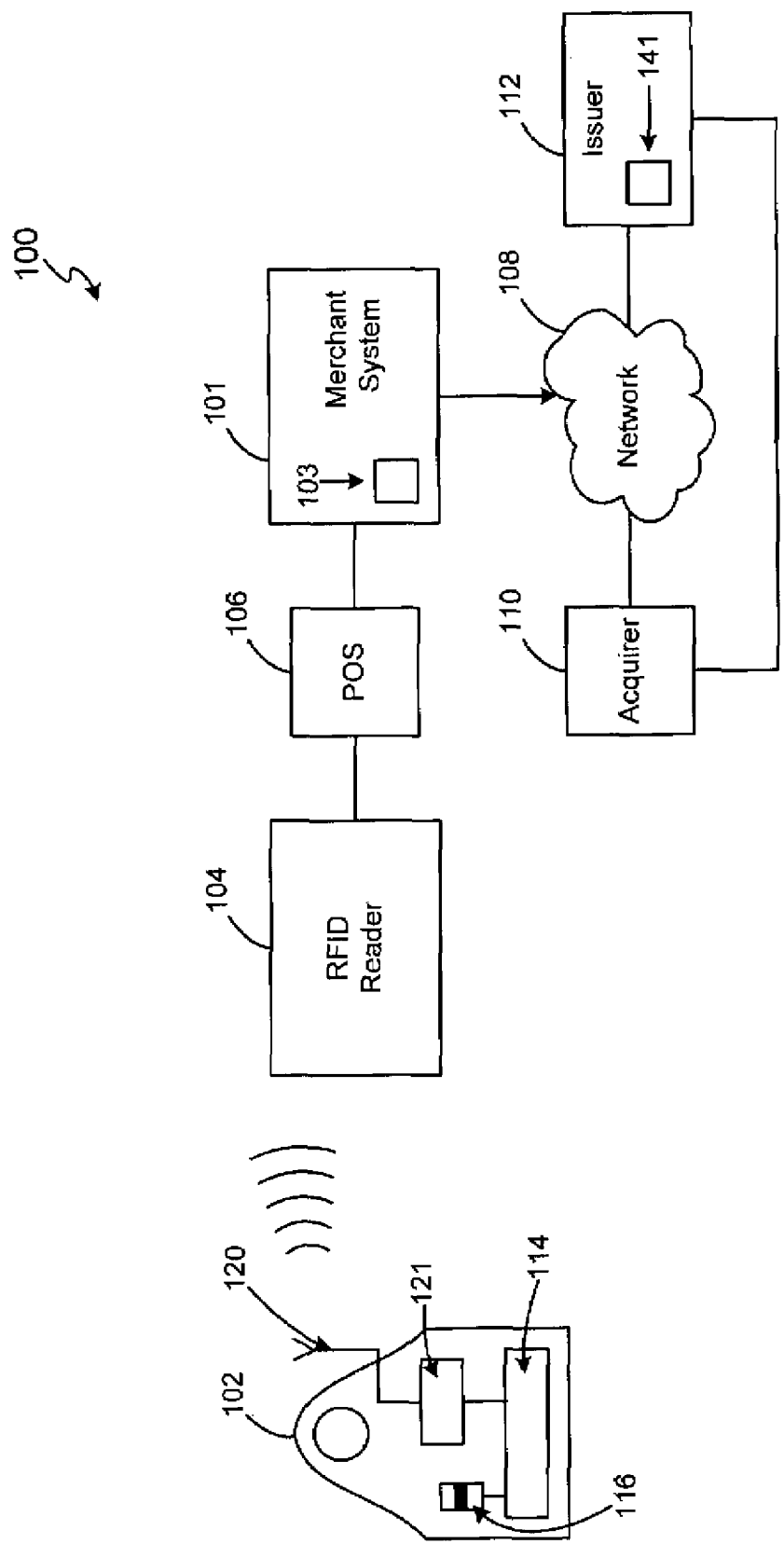
FIG. 1 illustrates an exemplary RFID transaction system depicting exemplary components for use in a secure RFID transaction completed in accordance with an exemplary embodiment of the present invention.

The present invention may be described herein in terms of functional block components, screen shots, optional selections and various processing steps. Such functional blocks may be realized by any number of hardware and/or software components configured to perform the specified functions.

In one exemplary embodiment, the transaction device is correlated with a unique RFID transaction device account number. In accordance with the invention, the account number is not provided to a merchant during transaction completion. Instead, the merchant system is provided a "proxy code" (described below). The transaction device proxy code is stored on a transaction device database located on the transaction device. The transaction device database is configured to store multiple proxy codes issued to the RFID transaction device user by the same or different account providing institutions.

To facilitate understanding, the present invention is described with respect to a charge, debit, credit, or loyalty account. However, it should be noted that the invention is not so limited. Other transaction accounts, which facilitate an exchange of goods or services, are contemplated to be within the scope of the present invention.

Various components are described herein in terms of their "validity." In this context, a "valid" component is one that is partially or fully authorized for use in completing a transaction request in accordance with the present invention. Contrarily, an "invalid" component is one that is not partially or fully authorized for transaction completion.

Although the present invention is described with respect to validating a transaction device or reader communicating in a RF transaction, the invention is not so limited. The present invention is used for any software, device, machine, or article, which provides user-identifying data to a merchant. Thus, the present invention is used in any contact or contactless environment where identifying data is transferred to a merchant.

During a typical RFID transaction, a RFID transaction device user transmits information concerning the user's transaction account to a merchant POS. The information received by the POS includes, for example, the transaction device identifier or account number. The information further includes personal, demographic, biometric or statistical information related to the transaction device user. Upon receiving the information, the merchant POS ordinarily provides the information to a merchant system. The merchant stores the information in a merchant system database for later reference. For example, the merchant system then references the transaction device information in the event that a user wishes to complete a transaction by providing the merchant the same identifying information as the merchant has stored on the merchant system.

In most instances, the transaction device information is stored on the merchant system database for an extended period of time. The extended storage is often performed because the merchant typically wishes to have the information readily available for later reference (e.g., transaction request maintenance, account or transaction request tracking, or the like). The merchant may also desire to archive the transaction device information for later use in preparing promotional offers or solicitations or materials to be provided to the transaction device user.

One key disadvantage of the conventional transaction processing method described above is that the information stored by the merchant is typically "sensitive information." Sensitive information is that information which the transaction account provider or the transaction device user would want to guard from theft or restrict use. Sensitive information is any information or data. In the wrong hands, the sensitive information is often used to conduct a fraudulent transaction. For example, sensitive information includes the user account number, transaction device identifier, transaction device user personal data and/or the like. The information is used, for example, to complete a transaction by reproducing the sensitive information without authorization. If sensitive information is somehow compromised or stolen, it is easily subjected to fraudulent usage. For example, should an unscrupulous person gain access to the merchant system and steal the transaction device identifier or account number, the person is able to use the stolen information to place fraudulent charges on the associated transaction account. As such, the merchant puts into place special security measures designed to protect the sensitive information from theft. The merchant ordinarily makes decisions related to securing the sensitive information without consulting the account provider. The transaction account provider often relies on the effectiveness of the merchant security measures to ensure that the information is not stolen while being stored on the merchant database. If the merchant security methods are ineffective or easily compromised, the sensitive information may be easily stolen.

The present system and method permits the account issuer to control the level of security with which the information stored on the merchant database is protected. As used herein, the term "proxy code" includes any device, hardware, software, code, number, letter, symbol, digital certificate, smart chip, digital signal, analog signal, biometric and/or other identifier/indicia. The proxy code also refers to any information provided to, for example, a merchant system during completion of a transaction request, which partially and/or fully masks the underlying sensitive information from the merchant system. As such, the information provided "masks" the underlying sensitive information related to the transaction account from the merchant system. Particularly, the information provided to the merchant (called "proxy code" herein) does not include sensitive information like, for example, the transaction account number. Consequently, in one embodiment, the merchant system is provided limited or no sensitive information since the sensitive information is not included in the proxy code. Moreover, the proxy code may take the form of any conventional transaction account identifier. As such, when the merchant receives the proxy code, the merchant system processes the proxy code under business as usual standards. For example, the proxy code may take the form of any conventional transaction device identifier and/or account number. The merchant system thereby stores the proxy code in the place of the information ordinarily stored under conventional processing methods. Since the proxy code does not include sensitive information, no sensitive information is stolen should the merchant system be compromised. In this way, the account issuer substantially eliminates, minimizes and/or controls the risks associated with the security of the merchant system being compromised (e.g., fraudulent transactions, identity theft, etc.). In alternative embodiments, the system and method also contemplates that certain sensitive information may be provided to the merchant, the merchant system may be partially re-configured to handle special data, and/or any other desired customization may be implemented.

Another advantage of an embodiment of the present invention is that since the proxy code is permanently associated to a transaction account, the proxy code need never be modified in the merchant system. As such, the present invention eliminates or reduces the need to update information on the merchant system every time the related transaction device is lost, stolen, or replaced. More particularly, the replacement device is provided the identical proxy code as was provided to the original transaction device. Consequently, the merchant is provided the identical proxy code in any instance where the user wishes to complete a transaction using the transaction account, which the account provider has permanently associated with the proxy code. When the transaction is sent to the account provider for reconciliation, the account provider determines that the proxy code correlates to the replacement device and not the original transaction device.

For example, the merchant receives the proxy code and stores the proxy code related to a recurrent billing account such as a telephone account. Periodically the merchant may bill a transaction device user in accordance with the telephone services provided. The device user may wish to provide the merchant with transaction device information the merchant may use to satisfy the bill. The user authorizes the merchant to store the device information for repeated use in satisfying the bill. In a conventional recurrent billing environment, the device information is ordinarily updated when the user loses the device or the device information expires. That is, the replacement device often is given device information, which is often different from the information contained on the original transaction device. However, in accordance with the present invention, the merchant need not update transaction device information because the proxy code is permanently associated with the transaction account. In other embodiments, the proxy code may be temporarily or periodically associated with the transaction account.

FIG. 1 illustrates an exemplary RFID transaction system 100 in accordance with the present invention, wherein exemplary components for use in completing a RF transaction are depicted. In general, system 100 includes a RFID transaction device 102 in RF communication with a RFID reader 104 for transmitting data there between. RFID reader 104 is in further communication with a merchant POS device 106 for providing to POS 106 information received from RFID transaction device 102. POS 106 is in further communication with a merchant system 101, which includes a merchant database 103. Merchant system 101 is in communication with an acquirer 110 and/or account issuer 112 via a network 108 for transmitting transaction request data and receiving authorization concerning transaction completion.

Although POS 106 is described herein with respect to a merchant POS device, the invention is not to be so limited. Indeed, a merchant POS device is used herein by way of example, and POS device 106 is any device capable of receiving transaction device account information from transaction device 102. In this regard, POS 106 is any point-of-interaction device, such as, for example, a merchant terminal, kiosk, user terminal, computer terminal, input/output receiver and/or reader, etc., enabling the user to complete a transaction using transaction device 102. POS device 106 receives RFID transaction device 102 information and provides the information to merchant system 101 for processing.

As used herein, an "acquirer" is any database and processor (e.g., operated by a third party) for facilitating the routing of a payment request to an appropriate account issuer 112. Acquirer 110 routes the payment request to account issuer 112 in accordance with a routing number, wherein the routing number corresponds to account issuer 112. RFID transaction device 102 provides the routing number. The "routing number" in this context is a unique network address and/or any similar device for locating account issuer 112 on network 108. In one exemplary embodiment, the routing number is typically stored on one of the "tracks" comprising a magnetic stripe network. For example, the proxy code is provided in traditional ISO magnetic stripe format. The routing number is typically stored in Track 1/Track 2 format so that the information is interpreted by POS device 106 and merchant system 101. Traditional means of routing the payment request in accordance with the routing number are well understood. As such, the process for using a routing number to provide a payment request will not be discussed herein.

In addition, account issuer 112 (or account provider) is any entity, which provides a transaction account useful for facilitating completion of a transaction request. The transaction account is any account, which maintains credit, debit, loyalty, direct debit, checking, savings, and/or the like. The term "issuer" or "account provider" refers to any entity facilitating payment of a transaction using a transaction device, and which includes systems permitting payment using at least one of a preloaded and non-preloaded transaction device 102. Typical issuers include American Express, MasterCard, Visa, Discover, and the like.

In general, during operation of system 100, RFID reader 104 provides an interrogation signal to transaction device 102 for powering device 102 and receiving transaction device related information. The interrogation signal is received at a transaction device antenna 120 and is further provided to a transponder 121. In response, a transaction device processor 114 retrieves transaction device information from transaction device database 116 for providing to RFID reader 104 to complete a transaction request. Typically, where the transaction device information includes a transaction device identifier or authentication tag, the identifier and tag is encrypted prior to providing the information to RFID reader 104.

It should be noted that RFID reader 104 and RFID transaction device 102 engages in mutual authentication prior to transferring any transaction device 102 data to RFID reader 104. For a detailed explanation of a suitable mutual authentication process for use with the invention, see commonly owned U.S. patent application Ser. No. 10/340,352, entitled "System and Method for Incenting Payment Using Radio Frequency Identification in Contact and Contactless Transactions," filed Jan. 10, 2003, incorporated by reference in its entirety.

Once RFID reader 104 receives transaction device 102 information, RFID reader 104 provides the information to the merchant POS 106 which provides the information to merchant system 101. Merchant system 101 then appends transaction device 102 information with transaction request data and provides the entire transaction request (i.e., transaction request data and transaction device 102 information) to acquirer 110 and/or issuer 112 for transaction completion. The transmitting of the information from transaction device 102 to acquirer 110 (or issuer 112) is accomplished in accordance with any conventional method for completing a transaction using contact and wireless data transmission. Acquirer 110 and/or issuer 112 then determines whether to authorize completion of the transaction request in accordance with any business as usual protocol.

In addition to appending transaction device 102 information to the transaction request data for transaction authorization, conventional merchant systems also store the transaction device information in a merchant system database (not shown) for later reference. For example, a particular merchant may want to provide special advertisements to the user of transaction device 102 based on the user's prior purchases at the merchant location. Merchant system 101 then recalls transaction device 102 information and use the information to prepare, for example, a repeat consumer mailing list. In some cases, however, merchant system 101 often also stores sensitive information related to the user such as, for example, the user's account number (e.g., transaction card number) associated with transaction device 102. This sort of information is typically very easy to use in fraudulent transactions and therefore must be secured from theft. As such, conventional merchant systems use special security methods to safeguard the sensitive information from theft.

Figure 2:
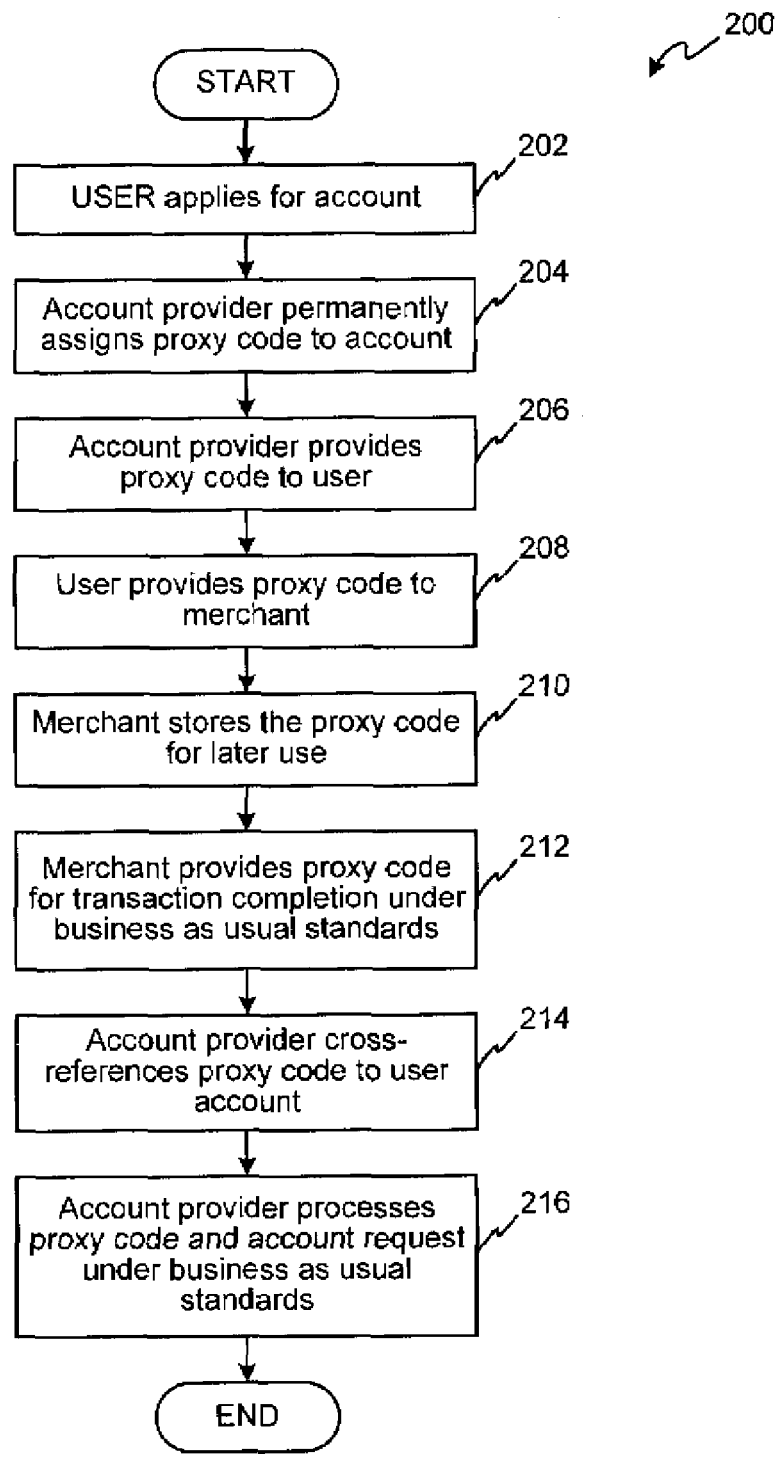
FIG. 2 depicts a flowchart of an exemplary method for securing a RFID transaction in accordance with an exemplary embodiment of the present invention.

An exemplary method 200 for safeguarding information from theft, in accordance with the present invention, is described in FIG. 2. In accordance with the invention, an account provider provides a transaction account to an account user for completing a transaction. The user receives the transaction account after the user provides information concerning the user to an account provider system (step 202). For example, if a user completes an application for a transaction card, the transaction card provider provides a credit transaction account to the user for transaction completion. Account issuer 112 provides additional security by assigning a permanent fixed proxy code to transaction device 102 transaction account, so that the proxy code need never be altered or modified during the life of the transaction account (step 204).

In this context, the account number is considered sensitive information. In assigning the proxy code, issuer system 112 correlates and/or matches the proxy code to the account number in, for example, a relational database. The algorithm is such that it receives the proxy code and operates on the proxy code to convert the proxy code to a number correlated with the transaction account number. Alternatively, account issuer 112 stores the proxy code in a one-to-one relationship with the account number. Further still, account issuer 112 uses any suitable correlation technique that is known which permits the account issuer system to receive one data and associate it with a second data. In other embodiments, the proxy code is derived from the account number or any other data field, where the proxy code is stored, for example, in data fields on transaction device 102. Where the proxy code is accompanied by a secondary identifier, such as, for example, a personal identification number (PIN), issuer system 112 database correlates and/or match the proxy code, account number and secondary identifier, so that issuer system 112 references any one of the numbers using any one of the other numbers. Issuer system 112 uses any conventional matching or storage protocol as is found in the art.

In one exemplary embodiment, issuer system 112 assigns distinct proxy codes for each transaction account issuer system 112 maintains. In which case, no two transaction accounts would be assigned identical proxy codes. In another exemplary embodiment, issuer system 112 assigns the same proxy code to a plurality of transaction accounts, to multiple accounts related to the same cardholder, to multiple accounts controlled by the same entity (e.g., corporate card accounts), to all the transaction accounts issuer system 112 maintains or any other subset of accounts. Moreover, a proxy code is not a separate code; rather, the proxy code is derived from the transaction device identifier or any other data. In another embodiment, the proxy code is contained within another code or account number. In another embodiment, the proxy code is an encrypted or manipulated account number (or any other sensitive information). The same proxy code, an amended proxy code or an additional proxy code may also represent other sensitive data (aside from the account number), such as, for example, account holder name, address, biometric information, demographic information and/or the like. In this regard, merchant system 101 will not have access to this information, but the proxy code related to this information will be sent to acquirer 110 when acquirer 110 requires any portion of this information as part of its approval process.

The proxy code is then loaded onto transaction device 102. In other embodiments, transaction device 102 generates its own proxy code. Transaction device 102 may facilitate the generation of a proxy code in a number of different ways. In one embodiment, transaction device 102 itself generates the proxy code from a self-contained processing chip. For example, transaction device 102 may be configured to contain multiple proxy codes, each one corresponding to the same funding account number stored in issuer system 112. A predefined system can then be used to select a proxy code to be used for submission of a payment authorization request. For example, in one predefined system, the first proxy code in the list of proxy codes is used for a predefined number of transactions and then discarded. In another predefined system, the proxy code to be used is based on the application transaction counter in transaction device 102. That is, predefined ranges in the transaction counter can correspond to predefined proxy codes for the user. In yet another example of a predefined system, a defined algorithm is used to continuously cycle through the set of assigned proxy codes. The defined algorithm can be random, sequential, based on the time, based on the date, and or based on any other logical schema.

Once transaction device 102 generates a code, the user downloads the generated proxy code to account issuer 112 (e.g., via the Internet) prior to using the code in a transaction. For example, the user PC can be configured with RFID reader 104 and/or and associated software to be used facilitate communication with account issuer 112 over the Internet. When desiring to make an online purchase, the user can wave transaction device 102 at RFID reader 104 and/or enter secondary identification, (i.e. a PIN). Once properly authenticated, issuer system 112 authorizes the transaction using the generated code.

In another embodiment, a user can use transaction device 102 to communicate with issuer system 112 to facilitate transaction device 102 in generating a code. Issuer system 112 can communicate with transaction device 102 to facilitate transaction device 102 cycling through to the next preloaded proxy code on transaction device 102. Transaction device 102 then communicates this preloaded proxy code back to issuer 112 so that issuer 112 can activate this new proxy code for use as a valid payment identifier in authorization requests.

In another embodiment, RFID reader 104, POS 106 and/or merchant system 101 generate a proxy code prior to, during or after receiving sensitive information. In this embodiment, RFID reader 104 deletes the sensitive information, and only transmits the proxy code to complete the transaction. For more information on securing transactions by providing a proxy code to a merchant system during a transaction instead of providing sensitive transaction account information, see U.S. patent application Ser. No. 10/708,569, entitled "SYSTEM AND METHOD FOR SECURING SENSITIVE INFORMATION DURING COMPLETION OF A TRANSACTION," filed Mar. 11, 2004 and incorporated herein by reference.

While transaction device 102 may only contain the proxy code, in certain embodiments, transaction device 102 also contains the account number and other sensitive data; however, transaction device 102 is configured to communicate the proxy code to RFID reader 104. In one exemplary embodiment, the proxy code is configured in magnetic stripe format. That is, the proxy code is stored in the Track 1/Track 2 portions of the magnetic stripe track network.

Account issuer 112 then provides the proxy code to the user, by embodying the proxy code in any presentable form factor such as RFID transaction device 102, a transaction card, debit card, calling card, loyalty card, key fob, cell phone, key ring, ring, and/or the like. That is, the proxy code is uploaded onto transaction device 102 which account issuer 112 has assigned to a user (step 206). The proxy code is uploaded into transaction device 102 database in magnetic stripe format, and is transmitted to merchant system 101 in similar magnetic stripe format. A suitable method for providing the proxy code to transaction device 102 is determined by transaction device 102 configuration. For example, conventional methods and magnetic stripe read/write devices are used to encode the proxy code in one location on one of the magnetic stripe tracks. Alternatively, the proxy code is uploaded into a database or other storage area contained on transaction device 102, by populating the proxy code on the database using any conventional method. A suitable method is described in commonly owned U.S. patent application Ser. No. 10/192,488, entitled "SYSTEM AND METHOD FOR RFID PAYMENT USING RADIO FREQUENCY IDENTIFICATION IN CONTACT AND CONTACTLESS TRANSACTIONS," incorporated herein by reference. Once the proxy code is uploaded into the transaction account database, transaction device 102 is used for transaction completion.

In this embodiment, the transaction account is also assigned a secondary form of identification which is encrypted, and which is not available to merchant system 101. The secondary form of identification is correlated to the transaction account on issuer system 112 so that issuer system 112 later references the transaction account for transaction completion.

Once the proxy code is assigned and loaded on transaction device 102, the proxy code is provided during the execution of a transaction in lieu of the actual transaction account number. In this way, the proxy code masks the actual account number from merchant system 101 and from potential theft. Thus, instead of merchant system 101 storing the account number for later reference, merchant system 101 stores the proxy code.

As noted, in one exemplary embodiment, the proxy code is formatted to mimic conventional transaction device 102 sensitive information, such as an account number. Because the proxy code mimics an account number or any other sensitive data and is configured in a format recognizable to merchant system 101, merchant system 101 is unable to distinguish between the proxy code and the actual account number. For example, where the actual account number is a transaction card number, the proxy code would be configured to take the form of a valid transaction card number. Similarly, where the actual account number is a loyalty number, the proxy code is configured in a format similar to a valid loyalty number. In either case, however, the proxy code contains no or minimal sensitive information related to the user account.

Transaction device 102 user then provides the proxy code to merchant system 101 during the completion of a transaction request (step 208). The manner in which the user provides the transaction account proxy code to the user system may vary in accordance with the form factor in which the proxy is embodied. For example, where the proxy code is embodied in the magnetic stripe of a conventional transaction card, the user provides the proxy code to the merchant by "swiping" the magnetic stripe at a suitable reader as is found in the prior art. Alternatively, the proxy code is embodied in a transponder system associated with a key fob. A suitable method for loading a fob with an account number, such as, the proxy code, is disclosed in U.S. patent application Ser. No. 10/708,385, filed Mar. 12, 2004, incorporated herein by reference. In this instance the user provides the account number to the merchant system by waiving the key fob in proximity to a suitable transponder reader. The reader provides an interrogation signal to the transponder system to facilitate operation of the transponder system and the transponder reader provides the proxy code to the merchant system for processing.

Merchant 101 receives the proxy code and stores the proxy code in merchant system database 103 for later reference (step 210). For example, where the user requests that merchant 101 store the proxy code in reference to a recurrent billing account for payment, merchant 101 stores the proxy code related to the recurrent billing account and periodically use the proxy code to seek payment. Merchant 101 then provides the proxy code to account issuer 112 in a transaction request, under the merchant defined business as usual standard to facilitate completing the transaction (step 212).

Because the proxy code is may be permanently assigned to the transaction account, merchant system 101 does not need to modify the proxy code on merchant system 101. Merchant system 101 stores the proxy code on merchant database 103 using any method the merchant ordinarily uses to store consumer data.

In assigning the proxy code (step 204), issuer system 112 first permits transaction device 102 user to open a transaction account for use in completing a transaction request. For example, the user opens a transaction account by providing personal or demographic information and the like to issuer system 112 which uses the information to assign a transaction account and account number to the user. The transaction account is identified by the account number in issuer system 112 database (not shown), and issuer system 112 is able to reference the transaction account using the account number when authorizing a transaction (step 214). That is, issuer 112 receives the proxy code and matches the proxy code which is stored on merchant database 103 to the corresponding transaction account stored on the issuer's database (step 214).

As shown, a secure RFID transaction in accordance with this embodiment begins when the RFID device 102 enters the interrogation zone of RFID reader 104 and is interrogated, such as when transaction device 102 is used to complete a transaction request (step 208). Transaction device 102 information, including the proxy code, device 102 encrypted identifier (where included), and account issuer 112 routing number, is then provided to device processor 114 for transmitting to RFID reader 104 via RF transmission.

RFID reader 104 receives transaction device 102 information, including the proxy code, and if necessary, converts the information into a POS recognizable format. The converted information is then provided to merchant system 101 via POS 106. Merchant system 101 receives transaction device 102 information and combines the information with information concerning the requested transaction to produce a transaction request. The transaction information includes a product and/or merchant location identifier, as well as the terms for satisfying the transaction (e.g., price to be paid, barter points to be traded, loyalty points to be redeemed). Because the proxy code is in the same format as the account number or other sensitive data, merchant system 101 recognizes the information as valid data for the respective field. Merchant system 101 then provides the transaction request to acquirer 110 via network 108 for transaction request completion.

Acquirer 110, in turn, provides the transaction request to the appropriate account issuer 112 for processing. Acquirer 110 identifies the appropriate account issuer 112 using the routing number provided by transaction device 102 to locate the network address corresponding to account issuer 112, thereby permitting acquirer 110 to provide the transaction request to account issuer 112 maintaining the corresponding transaction device account. Account issuer 112 receives the transaction request and process the transaction request in accordance with issuer system 112 defined protocol.

Figure 3:
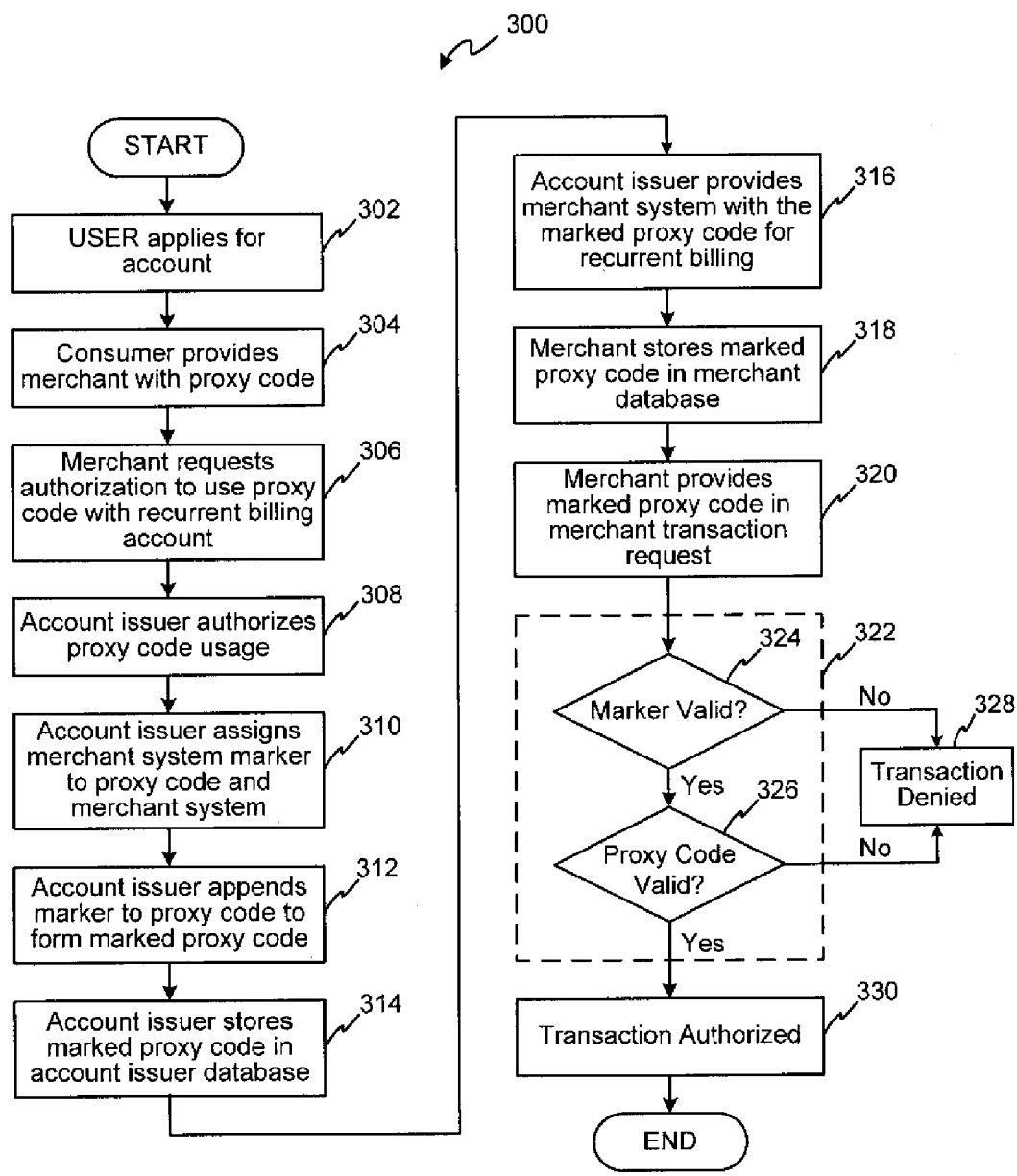
FIG. 3 depicts a flowchart of another exemplary method for securing a transaction using a proxy code in accordance with an exemplary embodiment of the present invention.

FIG. 3 depicts another exemplary method 300 illustrating usage of a proxy code. For example, a consumer requests that a merchant establish a transaction account for recurrent billing (step 302). To establish the account, the consumer may, for example, complete a recurrent billing processes enrollment application provided by the merchant, wherein the consumer provides the merchant with the consumer assigned proxy code (step 304). The recurrent billing application is completed online using a consumer interface (e.g., personal computer, kiosk, etc.) (not shown) connected to merchant system 101 via network 108, telephonically by calling merchant system 101 and completing the application using conventional public telephone networks (not shown), by completing a paper application and providing to merchant system 101 for processing, and/or by any other conventional method for enrolling in a merchant provided recurrent billing program.

Merchant system 101 requests authorization from account issuer 112 to use the proxy code in the merchant's recurrent billing transaction processing method (step 306). Merchant system 101 provides the request for authorization to issuer system 112 via network 108. The merchant request includes the proxy code provided to merchant system 101, and identifies the proxy code as the account number the consumer desires to use for pre-established periodic billing. Account issuer 112 receives the request and determines whether the proxy code should be used for the merchant's recurrent billing transaction processing method (step 308). In determining whether to authorize merchant system 101 request, account issuer 112 evaluates various account issuer 112 defined risk factors. For example, the account issuer system 112 evaluates the susceptibility of merchant system 101 to theft, the payment history of the consumer, and/or any other suitable risk determinative parameter, by, for example, analyzing any information stored in account issuer database 141, where the information relates to consumer spending history, and/or by analyzing known merchant system 101 parameters.

Once the merchant system 101 request is authorized (step 308), account issuer 112 assigns merchant system 101 with a marker that is unique to merchant system 101 (step 310). For example, it is well known that during transaction completion, merchant system 110 ordinarily provides account issuer 112 with merchant system 101 identifier. In assigning the marker, account issuer 112 correlates the marker to merchant system 101 in account issuer database 141. In this context, a marker is any tag, digital signature, digital code and/or the like which is used to identify merchant system 101 from other merchant systems. For example, in one exemplary embodiment, the marker comprises a digital signature that is created by deriving a secret key. The secret key is derived by calculating it from a merchant identification number using an industry standard method for secure key creation, such as, for example, a Security Access Module (SAM). The marker includes information about merchant system 101 encoded within the marker, such as, for example, a merchant category, a merchant address, owner information and/or the like.

In one particular embodiment, account issuer 112 assigns a particular marker to more than one merchant system 101. For example, account issuer 112 assigns the marker to a merchant based on class of goods and/or services offered by the merchant, the geographic location of the merchant, by any classification related to the consumer, and/or any other account issuer defined delineator. In one exemplary embodiment, account issuer 112 determines how to assign this particular marker to more than one merchant system 101 by, for example, comparing a "merchant type" code.

Account issuer 112 then uses the marker to digitally sign the customer proxy code and append the signature to the proxy code to form a "marked proxy code" (step 312). The digital signature is appended to the proxy code by any conventional method useful for distinguishing one account number from another. For example, if merchant system 101 supports a 19-digit account number, then the marker is appended as a unique digit combination appended to the proxy account number. In a particular instance, where the proxy code is a conventional 16-digit account number as is described above, the marker is a 3-digit numerical combination, such that the resulting 19-digit marked proxy code comprises the 16-digit proxy code and the 3-digit marker. Where merchant system 101 supports a 19-digit account number, and the proxy code is a 15-digit proxy code as is used, for example, with the American Express account numbering system, then the marker is a 4-digit numerical combination, such that the resulting 19-digit marked proxy code comprises the 15-digit proxy code and the 4-digit marker.

Alternatively and/or additionally, account issuer 112 provides the marker separately to merchant system 101 in an unused portion of the magnetic stripe formatting (ISO/IEC 7813) in which the proxy code is formatted. For example, the marker is encoded in a portion of the magnetic stripe format in which the proxy code is encoded, which is used for other purposes not relevant to the transaction. For example, the marker is encoded in a portion of the magnetic stripe format reserved for the consumer's name, address, and/or the like.

In yet another exemplary embodiment, the marker is a digital signature of the proxy code and the merchant identification appended to the proxy code. The digital signature is appended to the proxy code using any of the methods discussed above. Methods of providing digital signatures are well known and will not be discussed herein for brevity.

Once the marker is appended to the proxy code, account issuer 112 stores the marker on account issuer database 141 relative to merchant system 101 and the proxy code (step 314). In this way, account issuer 112 may refer to, and retrieve the proxy code and related merchant marker from account issuer database 141 for later use in validating merchant system 101 transaction request, as discussed more fully below.

Upon storing the merchant marker and the proxy code ("marked proxy") in account issuer database 141, account issuer 112 provides the marked proxy code to merchant system 101 for use in the merchant's recurrent billing process (step 316). However, in the case of the marker being a digital signature, the marker is stored in merchant database 103 and it is calculated in a similar way described herein, by using the merchant ID, a secret code and the proxy code. Merchant system 101 stores the marked proxy in merchant database 103 for later reference and use when requesting satisfaction of a merchant's recurrent billing request (step 318). Merchant system 101 stores the information in database 103 using any conventional method permitting easy retrieval and reference.

Periodically, merchant system 101 bills the consumer for services provided to the consumer and seeks satisfaction of the bill from account issuer 112 (step 320). Merchant system 101 requests satisfactions of a particular consumer bill by retrieving the marked proxy code from merchant database 103 and including the marked proxy code in a transaction request to be provided to account issuer 112. Merchant system 101 retrieves the proxy code associated with the consumer into merchant system database 103, using any merchant system 101 defined protocol. Additionally, merchant system 101 provides the marked proxy code to account issuer 112 via network 108, and/or using any merchant system 101 defined protocol for submitting transaction requests. That is, merchant system 101 may seek satisfaction of the transaction using any business as usual standards as is used by merchant system 101.

Account issuer 112 receives the transaction request including the marked proxy code and determines whether the marker and proxy code are valid for completing a transaction at account issuer 112 (step 322). In one embodiment, account issuer 112 compares the marker to the marker stored correlative to the proxy code and merchant system 101 in account issuer database 141. Account issuer 112 retrieves the marker stored correlative to merchant system 101 and compares the retrieved marker with the marker provided by merchant system 101 in the merchant's transaction request (step 324). If the marker provided by merchant system 101 does not correspond to the marker retrieved from account issuer database 141, then account issuer 112 denies transaction completion and a "TRANSACTION DENIED" message is provided to merchant system 101 (step 328).

Alternatively, if the marker provided by merchant system 101 corresponds to the marker retrieved from account issuer database 141, then account issuer 112 additionally validates the proxy code (step 326) using any of the methods discussed above. If account issuer 112 does not validate the proxy code, then account issuer 112 denies transaction completion and a "TRANSACTION DENIED" message is provided to merchant system 101 (step 328). However, if account issuer 112 validates the proxy code, then account issuer 112 authorizes transaction completion and a "TRANSACTION AUTHORIZED" message is provided to merchant system 101 (step 330). The transaction is then completed under business as usual standards.

In another exemplary embodiment, where the marker is a digital signature, account issuer 112 validates the digital signature using any conventional method as is known. For example, if the digital signature requires a decryption key for validation, account issuer 112 stores the decryption key relative to the marked proxy code in account issuer database 141. Account issuer 112 receives the marked proxy code from merchant system 101, retrieves the corresponding decryption key from account issuer database 141 and uses the decryption key to decrypt the marker. If account issuer 112 decrypts the marker successfully (step 324), then the account issuer validates the proxy code (step 326) as discussed above. Alternatively, if account issuer 112 does not successfully decrypt the marker using the decryption key (step 324), account issuer 112 provides a "TRANSACTION DENIED" message to merchant system 101 and the transaction is terminated (step 328). If both the marker and the proxy code are validated (steps 324, 326) then account issuer 112 provides the merchant with a "TRANSACTION AUTHORIZED" message and the transaction is completed under account issuer 112 and merchant system 101 business as usual standards (step 330).

The present invention may employ various integrated circuit components (e.g., memory elements, processing elements, logic elements, look-up tables, and the like), which may carry out a variety of functions under the control of one or more microprocessors or other control devices. The software elements of the present invention may be implemented with any programming or scripting language such as C, C++, Java, COBOL, assembler, PERL, extensible markup language (XML), JavaCard and MULTOS with the various algorithms being implemented with any combination of data structures, objects, processes, routines or other programming elements. Further, it should be noted that the present invention may employ any number of conventional techniques for data transmission, signaling, data processing, network control, encryption and the like. For a basic introduction on cryptography, review a text written by Bruce Schneier entitled "Applied Cryptography: Protocols, Algorithms, and Source Code in C," published by John Wiley & Sons (second edition, 1996), herein incorporated by reference.

The exemplary network disclosed herein includes any system for exchanging data or transacting business, such as the Internet, an intranet, an extranet, WAN, LAN, satellite communications, and/or the like. It is noted that the network may be implemented as other types of networks, such as an interactive television network (ITN). Further still, the terms "Internet" or "network" refer to the Internet, any replacement, competitor or successor to the Internet, or any public or private inter-network, intranet or extranet that is based upon open or proprietary protocols. Specific information related to the protocols, standards, and application software utilized in connection with the Internet are discussed herein. For further information regarding such details, see, for example, Dilip Naik, "Internet Standards and Protocols" (1998); "Java 2 Complete," various authors, (Sybex 1999); Deborah Ray and Eric Ray, "Mastering HTML 4.0" (1997); Loshin, "TCP/IP Clearly Explained" (1997). All of these texts are hereby incorporated by reference.

By communicating, a signal travels to/from one component to another. The components are directly connected to each other or are connected through one or more other devices or components. The various coupling components for the devices include but are not limited to the Internet, a wireless network, a conventional wire cable, an optical cable or connection through air, water, or any other medium that conducts signals, and any other coupling device or medium.

Where required, the system user interacts with the system via any input device such as, a keypad, keyboard, mouse, biometric device, kiosk, personal digital assistant, a magnetic stripe card, handheld computer (e.g., Palm Pilot®, Blackberry®), cellular phone and/or the like. Similarly, the invention could be used in conjunction with any type of personal computer, network computer, work station, minicomputer, mainframe, or the like, running any operating system such as any version of Windows, Windows NT, Windows 2000, Windows 98, Windows 95, MacOS, OS/2, BeOS, Linux, UNIX, Solaris, or the like. Moreover, it should be understood that the invention could be implemented using TCP/IP communications protocol, SNA, IPX, Appletalk, IPte, NetBIOS, OSI or any number of communications protocols. Moreover, the transactions discussed herein include or result in the use, sale, or distribution of any goods, services or information over any network having similar functionality described herein.

A variety of conventional communications media and protocols are used for data links providing physical connections between the various system components. For example, the data links are an Internet Service Provider (ISP) configured to facilitate communications over a local loop as is typically used in connection with standard modem communication, cable modem, dish networks, ISDN, Digital Subscriber Lines (DSL), or any wireless communication media. In addition, the merchant system including a merchant POS device and host network reside on a local area network, which interfaces to a remote network for remote authorization of an intended transaction. The POS communicates with the remote network via a leased line, such as a T1, D3 line, or the like. Such communications lines are described in a variety of texts, such as, "Understanding Data Communications," by Gilbert Held, which is incorporated herein by reference.

A transaction device identifier, as used herein, includes any identifier for a transaction device, such as, for example, any hardware, software, code, number, letter, symbol, digital certificate, smart chip, digital signal, analog signal, biometric and/or other identifier/indicia. The device identifier is also correlated to a user transaction account (e.g., credit, charge debit, checking, savings, reward, loyalty, or the like) maintained by a transaction account provider (e.g., payment authorization center). A typical transaction account identifier (e.g., account number) distinct to a transaction device, is correlated to a credit or debit account, loyalty account, or rewards account maintained and serviced by such entities as American Express, Visa, MasterCard or the like.

A transaction device identifier or account number is, for example, a sixteen-digit transaction card number, although each credit provider has its own numbering system, such as the fifteen-digit numbering system used by American Express, a nineteen-digit numbering system, and/or any other numbering system used by credit and/or other providers. Each company's transaction card numbers comply with that company's standardized format such that the company using a sixteen-digit format, for example, will generally use four spaced sets of numbers, as represented by the number "0000 0000 0000 0000". In a typical example, the first five to seven digits are reserved for processing purposes and identify the issuing bank, card type and, etc. In this example, the last sixteenth digit is used as a sum check for the sixteen-digit number. The intermediary eight-to-ten digits are used to uniquely identify the consumer. The account number transaction device is stored as Track 1 and Track 2 data as defined in ISO/IEC 7813, and further is created unique to the RFID transaction device. The account number or transaction device are communicated in Track 1 and Track 2 data, as well.

The databases discussed herein are any type of database, such as relational, hierarchical, object-oriented, and/or the like. Common database products that are used to implement the databases include DB2 by IBM (White Plains, N.Y.), any of the database products available from Oracle Corporation (Redwood Shores, Calif.), Microsoft Access or MSSQL by Microsoft Corporation (Redmond, Wash.), or any other database product. Databases are organized in any suitable manner, including as data tables or lookup tables. Association of certain data is accomplished through any data association technique known and practiced in the art. For example, the association is accomplished either manually or automatically. Automatic association techniques include, for example, a database search, a database merge, GREP, AGREP, SQL, and/or the like. The association step is accomplished by a database merge function, for example, using a "key field" in each of the manufacturer and retailer data tables. A "key field" partitions the database according to the high-level class of objects defined by the key field. For example, a certain class is designated as a key field in both the first data table and the second data table, and the two data tables are then merged on the basis of the class data in the key field. In this embodiment, the data corresponding to the key field in each of the merged data tables can be the same. However, data tables having similar, though not identical, data in the key fields are also merged by using AGREP, for example.

In accordance with one aspect of the present invention, any suitable data storage technique is utilized to store data without a standard format. Data sets are stored using any suitable technique, including, for example, storing individual files using an ISO/IEC 7816-4 file structure; implementing a domain whereby a dedicated file is selected that exposes one or more elementary files containing one or more data sets; using data sets stored in individual files using a hierarchical filing system; data sets stored as records in a single file (including compression, SQL accessible, hashed via one or more keys, numeric, alphabetical by first tuple, etc.); block of binary (BLOB); stored as ungrouped data elements encoded using ISO/IEC 7816-6 data elements; stored as ungrouped data elements encoded using ISO/IEC Abstract Syntax Notation (ASN.1) as in ISO/IEC 8824 and 8825; and/or other proprietary techniques that include fractal compression methods, image compression methods, etc.

In one exemplary embodiment, the ability to store a wide variety of information in different formats is facilitated by storing the information as a BLOB. Thus, any binary information can be stored in a storage space associated with a data set. As discussed above, the binary information is stored on the financial transaction instrument or external to but affiliated with the financial transaction instrument. The BLOB method stores data sets as ungrouped data elements formatted as a block of binary via a fixed memory offset using either fixed storage allocation, circular queue techniques, or best practices with respect to memory management (e.g., paged memory, least recently used, etc.). By using BLOB methods, the ability to store various data sets that have different formats facilitates the storage of data associated with the financial transaction instrument by multiple and unrelated owners of the data sets. For example, a first data set which is stored is provided by a first issuer, a second data set which is stored is provided by an unrelated second issuer, and yet a third data set which is stored, is provided by an third issuer unrelated to the first and second issuer. Each of these three exemplary data sets contains different information that is stored using different data storage formats and/or techniques. Further, each data set contains subsets of data, which also is distinct from other subsets.

In addition to the above, the transaction device identifier is associated with any secondary form of identification configured to allow the consumer to interact or communicate with a payment system. For example, the transaction device identifier is associated with, for example, an authorization/access code, personal identification number (PIN), Internet code, digital certificate, biometric data, and/or other secondary identification data used to verify a transaction device user identity.

It should be further noted that conventional components of RFID transaction devices are not discussed herein for brevity. For example, one skilled in the art will appreciate that the RFID transaction device and the RFID reader disclosed herein include traditional transponders, antennas, protocol sequence controllers, modulators/demodulators and the like, necessary for proper RFID data transmission. A suitable RFID transaction device and RFID reader which is used with this invention are disclosed in U.S. patent application Ser. No. 10/192,488, filed Jul. 9, 2002. As such, those components are contemplated to be included in the scope of the invention.

The preceding detailed description of exemplary embodiments of the invention makes reference to the accompanying drawings, which show the exemplary embodiment by way of illustration. While these exemplary embodiments are described in sufficient detail to enable those skilled in the art to practice the invention, it should be understood that other embodiments are realized and that logical and mechanical changes are made without departing from the spirit and scope of the invention. In addition, the steps recited in any of the method or process claims is executed in any order and are not limited to the order presented or method steps are added or eliminated as desired. Further, the present invention is practiced using one or more servers, as necessary. Thus, the preceding detailed description is presented for purposes of illustration only and not of limitation, and the scope of the invention is defined by the preceding description, and with respect to the attached claims.

What is claimed is:

1. An account issuer system comprising:
a processor;
a network interface communicating with the processor;
a memory connected to said processor;
the memory storing instructions that, when executed, cause the processor to perform the steps of:
receiving, from a merchant system, a request to establish a recurrent billing account, said request including a proxy code associated with a primary account number associated with a transaction account wherein said merchant receives a request from a customer to set up said recurring billing account funded by said transaction account;
assigning a merchant system marker to said merchant system to identify said merchant system;
creating a marked proxy code by appending said merchant system marker to said proxy code;
storing said marked proxy code correlative with said merchant system in said memory;
sending said marked proxy code to said merchant system;
receiving, from said merchant system, a merchant transaction request including said marked proxy code; and
validating said marked proxy code prior to authorizing satisfaction of said merchant transaction request.

2. The system of claim 1, wherein said merchant system marker is associated with a plurality of merchant systems.

3. The system of claim 1, wherein said merchant system marker is associated with said merchant system.

4. The system of claim 1, wherein said proxy account number is in magnetic stripe ISO/IEC 7813 format.

5. The system of claim 1, wherein said account issuer program is configured to append said merchant system marker to said proxy account number to form said marked proxy account number.

6. The system of claim 1, wherein said account issuer program appends said merchant system marker to said proxy account number using at least a portion of a magnetic stripe format.

7. The system of claim 1, wherein said merchant system marker is a digital signature.

8. The system of claim 1, wherein said memory is configured to store a decryption key for use in decrypting a digital signature during validation of said merchant system marker.

9. The system of claim 1, wherein said merchant system is configured to send a merchant transaction request, comprising said marked proxy account number, to said account issuer system, and said account issuer program is configured to retrieve a decryption key for use in validating said merchant system marker.

10. The system of claim 1, wherein said account issuer program is configured to validate said marked proxy account number provided by said merchant system, said account issuer program configured to retrieve said marked proxy account number stored in said memory and to compare said marked proxy account number provided by said merchant system to said marked proxy account number stored in said account issuer database to determine if a match exists.

11. A method for securing recurrent billing transactions comprising:
receiving, by an account issuer computer and from a merchant system, a request to establish a recurrent billing account, said request including a proxy code associated with a primary account number associated with a transaction account, wherein said merchant receives a request from a customer to set up said recurring billing account funded by said transaction account;
assigning, by said account issuer computer, a merchant system marker to said merchant system to identify said merchant system;
creating, by said account issuer computer, a marked proxy code by appending said merchant system marker to said proxy code;
storing, by said account issuer computer, said marked proxy code correlative with said merchant system in a database;
sending, by said account issuer computer, said marked proxy code to said merchant system;
receiving, by said account issuer computer and from said merchant system, a merchant transaction request including said marked proxy code; and
validating, by said account issuer computer, said marked proxy code prior to authorizing satisfaction of said merchant transaction request.

12. The method of claim 11, wherein said validating said marked proxy code comprises:
retrieving said merchant system marker stored in said database;
determining a second merchant system marker based upon said marked proxy code included in said merchant transaction request;
comparing said merchant system marker retrieved from said database to said second merchant system marker; and
validating said merchant transaction request if said merchant system marker retrieved from said database corresponds to said second merchant system marker.

13. The method of claim 12, wherein said retrieving said merchant system marker stored in said database includes recalculating said merchant system marker using a secret key.

14. The method of claim 11, wherein said assigning said merchant system marker to said merchant system includes assigning said merchant system marker comprising a digital signature, said digital signature created by deriving a secret key.

15. The method of claim 14, wherein said deriving said secret key includes calculating said secret key from a merchant identification number using an encryption algorithm for secure key creation.

16. The method of claim 14, wherein said deriving said secret key includes using a Security Access Module.

17. The method of claim 11, wherein said storing said marked proxy code includes storing said marked proxy code on said database wherein said database is further configured to store a merchant system marker decryption key corresponding to said merchant system marker.

18. The method of claim 17, wherein said validating said merchant system transaction request comprises:
retrieving said merchant system marker decryption key from said database;
decrypting said merchant system marker received in said merchant transaction request using said merchant system marker decryption key to form a decrypted merchant system marker; verifying said decrypted merchant system marker using at least one of said merchant marker decryption key, said proxy code, a merchant identification number and data elements that are included in said digital signature;
comparing said decrypted merchant system marker to said merchant system marker stored in said database; and
validating said merchant transaction request if said decrypted merchant system marker corresponds to said merchant system marker stored in said database.

* * * * *

UNITED STATES PATENT AND TRADEMARK OFFICE
CERTIFICATE OF CORRECTION

| | | |
|---|---|---|
| PATENT NO. | : 7,650,314 B1 | Page 1 of 1 |
| APPLICATION NO. | : 11/164609 | |
| DATED | : January 19, 2010 | |
| INVENTOR(S) | : Peter D. Saunders | |

It is certified that error appears in the above-identified patent and that said Letters Patent is hereby corrected as shown below:

On the Title page, section (75) Inventor, please delete "Peter Saunders" and insert therefor --Peter D. Saunders--.

In column 18, line 52, please delete "wherein said account issuer program is configured to append" and insert therefor --said instructions further causing the processor to perform appending--.

In column 18, line 56, please delete "wherein said account issuer program appends" and insert therefor --said instructions further causing the processor to perform appending--.

In column 19, line 1, please delete "said account issuer program is configured to retrieve" and insert therefor --said instructions further causing the processor to perform retrieving--.

In column 19, line 4, please delete "wherein said account issuer program is configured to validate" and insert therefor --said instructions further causing the processor to perform validating--.

Signed and Sealed this

Twentieth Day of April, 2010

David J. Kappos
*Director of the United States Patent and Trademark Office*

UNITED STATES PATENT AND TRADEMARK OFFICE
CERTIFICATE OF CORRECTION

PATENT NO. : 7,650,314 B1  
APPLICATION NO. : 11/164609  
DATED : January 19, 2010  
INVENTOR(S) : Peter Saunders Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1085 days.

Signed and Sealed this

Twenty-third Day of November, 2010

David J. Kappos  
*Director of the United States Patent and Trademark Office*